US006263374B1

United States Patent
Olnowich et al.

(10) Patent No.: US 6,263,374 B1
(45) Date of Patent: *Jul. 17, 2001

(54) APPARATUS FOR COUPLING A BUS-BASED ARCHITECTURE TO A SWITCH NETWORK

(75) Inventors: Howard Thomas Olnowich, Endwell; Michael Wayland Dotson, Binghamton; James William Feeney, Endicott, all of NY (US); Michael Hans Fisher, Rochester, MN (US); John David Jabusch, Endwell, NY (US); Robert Francis Lusch, Vestal, NY (US); Michael Anthony Maniguet, Owego, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/286,107

(22) Filed: Aug. 4, 1994

Related U.S. Application Data

(63) Continuation of application No. 07/947,644, filed on Sep. 17, 1992, now abandoned.

(51) Int. Cl.[7] .................................................. G06F 15/173
(52) U.S. Cl. ........................... 709/253; 709/250; 710/129; 710/131
(58) Field of Search ..................................... 395/200, 250, 395/275, 325, 500, 200.02, 200.15, 200.16, 200.2; 709/250, 253; 710/129, 131

(56) References Cited

U.S. PATENT DOCUMENTS

| | | | |
|---|---|---|---|
| 3,601,546 | 8/1971 | Lee | 340/825.04 |
| 3,800,097 | 3/1974 | Maruscak et al. | 361/791 |
| 4,201,889 | 5/1980 | Lawrence et al. | 370/388 |
| 4,672,570 * | 6/1987 | Benken | 709/250 |
| 4,706,150 * | 11/1987 | Lebizay et al. | 340/825.5 |
| 4,747,073 | 5/1988 | Desbois et al. | 710/101 |
| 4,748,656 * | 5/1988 | Gibbs et al. | 379/93.05 |
| 4,807,282 | 2/1989 | Kazan | 379/284 |
| 4,845,709 | 7/1989 | Matsumoto et al. | 370/452 |
| 4,855,903 | 8/1989 | Carleton et al. | 709/248 |
| 4,858,162 | 8/1989 | Kieffer et al. | 361/683 |
| 4,864,496 | 9/1989 | Triolo et al. | 710/126 |
| 4,896,289 | 1/1990 | Svinicki et al. | 714/34 |
| 4,908,823 * | 3/1990 | Haagens et al. | 370/464 |
| 4,949,301 | 8/1990 | Joshi et al. | 711/100 |
| 4,965,788 | 10/1990 | Newman | 370/410 |
| 4,967,405 * | 10/1990 | Upp et al. | 359/135 |
| 4,969,083 | 11/1990 | Gates | 700/18 |
| 4,979,097 | 12/1990 | Triolo et al. | 709/253 |
| 5,058,053 | 10/1991 | Gillett | 710/131 |
| 5,123,011 * | 6/1992 | Hein et al. | 370/380 |
| 5,136,584 * | 8/1992 | Hedlund | 370/399 |
| 5,155,810 | 10/1992 | McNamara et al. | 710/52 |
| 5,163,833 | 11/1992 | Olsen et al. | 439/61 |
| 5,222,216 * | 6/1993 | Parish et al. | 710/130 |
| 5,261,059 * | 11/1993 | Hedberg et al. | 710/132 |
| 5,297,257 * | 3/1994 | Struger et al. | 700/83 |
| 5,321,819 * | 6/1994 | Szczepanek | 709/228 |
| 5,379,386 * | 1/1995 | Swarts et al. | 710/129 |

OTHER PUBLICATIONS

IBM TDB vol. 33, No. 5, Oct., 1990, "Asynchronous Digital Video Switching System", by Farrell et al, pp. 227–233.

* cited by examiner

Primary Examiner—Kenneth S. Kim
(74) Attorney, Agent, or Firm—Shelley M Beckstrand

(57) ABSTRACT

An apparatus that converts and adapts standard processor bus protocol and architecture, such as the MicroChannel bus, to more progressive switch interconnection protocol and architecture. Existing bus-based architecture is extended to perform parallel and clustering functions by enabling the interconnection of thousands of processors. The apparatus is relatively easy to implement and inexpensive to build. The communication media is switch-based and is fully parallel, supporting nodes interconnected by the switching network.

20 Claims, 21 Drawing Sheets

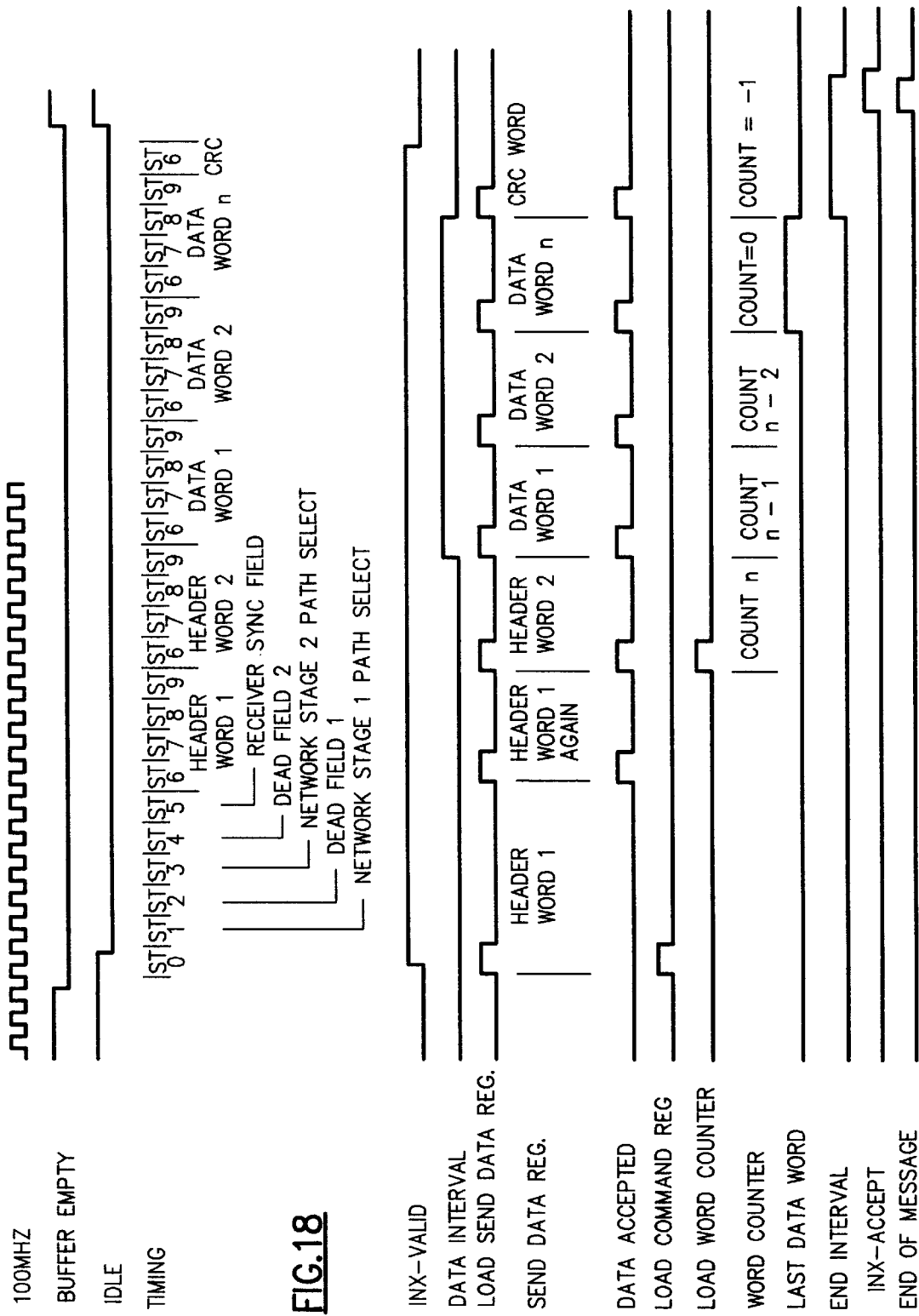

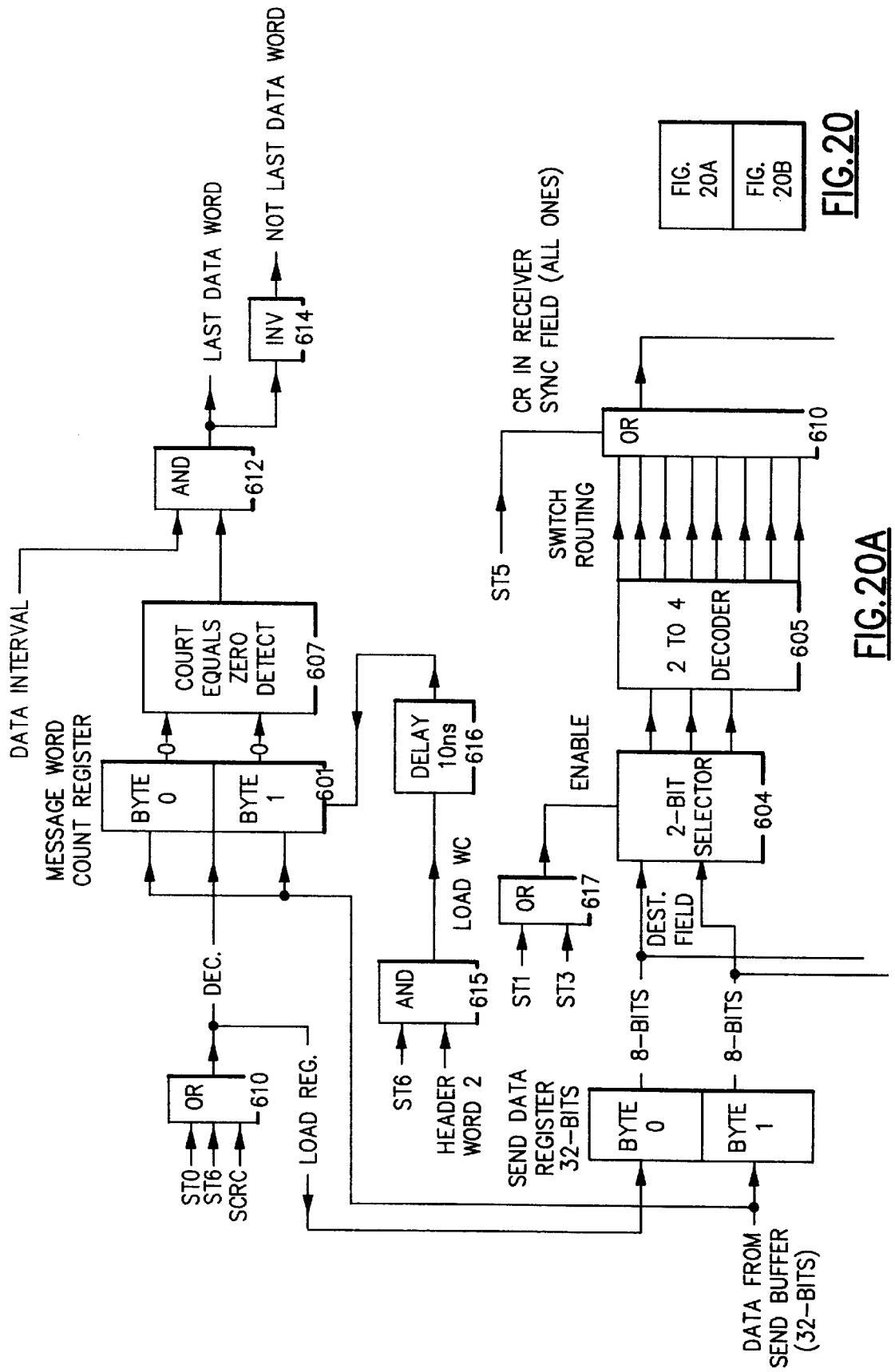

APPARATUS FOR COUPLING A BUS-BASED ARCHITECTURE TO A SWITCH NETWORK

RELATED APPLICATIONS

This application is a continuation of U.S. patent application Ser. No. (U.S. Ser. No.) 07/947,644 filed Sep. 17, 1992 now abandoned.

The present United States patent application claims priority as a continuation-in-part application and is related to the following applications:

U.S. Ser. No. 07/677,543, filed Mar. 29, 1991, entitled "All-Node Switch, An Unclocked, Unbuffered Asynchronous Switching Apparatus", by P. A. Franasck et al., abandoned in favor of FWC Ser. No. 08/149,977, which was abandoned in favor of Ser. No. 08/457,789; and U.S. Ser. No. 07/799,497, Filed Nov. 27, 1991, entitled "Multi-Function Network" by H. T. Olnowich, et al., abandoned in favor of FWC Ser, No. 08/216,789, which was abandoned in favor of FWC Ser. No. 08/606,232, now U.S. Pat. No. 5,654,695; and U.S. Ser. No. 07/799,602, Filed Nov. 27, 1991, entitled "Multi-Media Serial Line Switching Adapter for Parallel Networks and Heterogenous and Homologous Computer Systems", by H. T. Olnowich, et al., which was abandoned in favor of Ser. No. 08/390,893, now U.S. Pat. No. 5,535,373; and in favor of Ser. No. 08/178,974, now U.S. Pat. No. 5,612,953; and in favor of Ser. No. 08/178,957, which was abandoned in favor of Ser. No. 08/521,774, which was abandoned in favor of Ser. No. 08/810,270, now U.S. Pat. No. 5774,698.

The present application is also related to the following applications filed concurrently herewith:

U.S. Ser. No. 07/947,196, filed Sep. 17, 1992, entitled "Multi-Media Analog/Digital/optical Switching Apparatus", by H. T. Olnowich et al.; and U.S. Ser. No. 07/946,204, filed Sep. 17, 1992. entitled "Switch-Based MicroChannel Planar Apparatus" by H. T. Olnowich et al. now issued U.S. Pat. No. 5,495,474; and, U.S. Ser. No. 07/946,512 filed Sep. 17, 1992, entitled "Switch-Based Personal Computer Interconnection Apparatus" by H. T. Olnowich et al. now abandoned; and, U.S. Ser. No. 07/946,502, filed Sep. 17, 1992, entitled "Master MicroChannel Apparatus for Converting to Switch Architecture" by H. T. Olnowich et al. now abandoned; and, U.S. Ser. No. 07/946,203, filed Sep. 17, 1992, entitled "Multipath Torus Switching Apparatus" by H. T. Olnowich et al. now issued U.S. Pat. No. 5,408,646; and, U.S. Ser. No. 07/946,513, filed Sep. 17, 1992, entitled "Variable Cyclic Redundancy Coding Method and Apparatus" by H. T. Olnowich et al. now issued U.S. Pat. No. 5,734,826; and, U.S. Ser. No. 07/947,010, filed Sep. 17, 1992, entitled "Signal Regeneration Apparatus for Multi-Stage Transmissions" by H. T. Olnowich et al. now issued U.S. Pat. No. 5,920,704; and, U.S. Ser. No. 07/947,023, filed Sep. 17, 1992, entitled "Adaptive Switching Apparatus for Multi-Stage Networks", by H. T. Olnowich et al. now issued U.S. Pat. No. 5,345,229; and, U.S. Ser. No. 07/946.986, filed Sep. 17, 1992, entitled "Priority Interupt Switching Apparatus for Real Time Systems", by H. T. Olnowich et al. now issued U.S. Pat. No. 5,922,063; and, U.S. Ser. No. 07/946,509, filed Sep. 17, 1992, entitled "Message Header Generation Apparatus for Parallel Systems", by H. T. Olnowich et al now issued U.S. Pat. No. 5,922,063.

These applications and the present application are owned by one and the same assignee, International Business Machines Corporation of Armonk, N.Y.

The descriptions set forth in the previous applications and the concurrently filed applications are incorporated by reference.

FIELD OF THE INVENTIONS

The present invention relates to personal computer and workstation systems and the ability to cluster many systems to perform high speed, low-latency communications with each other in a parallel fashion over switching net-works.

The present invention also relates to digital computer systems and the ability to adapt personal computer and workstation systems that were designed to function as uniprocessors to function effectively as multi-processors; i.e., individual nodes of a message passing parallel system.

GLOSSARY OF TERMS

Card slots
  Receptacle connectors internal to a PC or workstation for the purpose of receiving expansion cards for attachment and expansion of the internal I/O bus.
Expansion Card
  A board of components that function together as a co-processing or I/O element. The card board has multiple wiring planes used to interconnect all components mounted on the board. The card board has a connector element used to connect the card to the planar (usually the card connector is inserted into the planar connector receptacle). The active components on the card usually include a co-processing and/or I/O element, remote memory, and an I/O interface in the form of a multi-drop bus that connects to the planar through the card connector for communication to other processor or I/O cards.
I/O
  Abbreviation for input/output
MicroChannel
  The IBM Trademark for the specific I/O, multi-drop bus used in most IBM PCs and workstations. In the description MicroChannel is used to describe a multi-drop bus.
MC
  Abbreviation for MicroChannel
MicroChannel Converter
  A functional converter that converts the standard MicroChannel bus interface and protocol to the switching network interface and protocol.
MCC
  Abbreviation for MC Converter
MCC-M
  Abbreviation for Master MC Converter
MCC-S
  Abbreviation for Slave MC Converter
MicroChannel Island
  The MicroChannel Bus that resides entirely within a given PC or workstation.
MI
  Abbreviation for MicroChannel Island
MSG
  Abbreviation for Message, which is data sent between two nodes of a parallel system.
Node
  A functional element of the system comprised of one personal computer or workstation providing a standard bus interface, which is used to connect to various input/output devices including the switching network of the present invention.

Nodal element
   Another term for node, which has the same meaning.
NO-OP
   A command sent over the MicroChannel to the SA adapter or expansion card that indicates that the SA should respond passively and not perform any operation (NO OPeration).
Parallel System
   A collection of two or more nodal elements which are interconnected via a switch network and function together simultaneously.
PC
   Abbreviation for Personal Computer
PIO
   A processor instruction called Programmed Input/Output (PIO) for the purpose of transfering data located in general purpose registers in the processor to I/O devices on the MicroChannel bus, or vice versa.
Planar
   A interconnection board or motherboard having multiple wiring planes. The planar contains active components, such as a multi-stage switching network, and inactive components, such as connector slots capable of receiving processor or expansion cards. The planar provides the interconnection wiring amongst the said cards.
Port
   A single bi-directional input or output point to a switching network.
POS
   A standard MicroChannel control sequence to perform Power-on Option Selections (POS) usualy associated with system initialization.
Processor Card
   A board of components that function together as a processing element. The card board has multiple wiring planes used to interconnect all components mounted on the board. The card board has a connector element used to connect the card to the planar (usually the card connector is inserted into the planar connector receptacle). The active components on the card usually include a computing element, memory (local and cache), and an I/O interface in the form of a multi-drop bus that connects to the planar through the card connector for communication to other processor or I/O cards.
Receiving Node
   A functional element of the system comprised of one or more processor and/or expansion cards interconnected by a standard bus to a switching network, which is receiving data transmitted over the switching network.
SA
   Abbreviation for Switch Adapter
SA-M
   Abbreviation for Switch Adapter providing the Bus Master function
SA-S
   Abbreviation for Switch Adapter providing the Slave function
Sending Node
   A functional element of the system comprised of one or more processor and/or expansion cards interconnected by a standard bus to a switching network, which is transmitting data over the switching network.
Switch Adapter
   An alternate name for the MicroChannel Converter apparataus

BACKGROUND OF THE INVENTIONS

Multi-stage switching networks are gaining acceptance as a means for interconnecting multiple devices within modern digital computing systems. In particular, in parallel systems it is common to use a multi-staged switching network to interconnect n system elements, where n can be several or thousands of processors or combinations of processors and other system elements. However, most state-of-the-art processors are designed to function as uniprocessors and do not implement the functions normally required to function effectively as multi-processors. The problem becomes one of how to effectively adapt uniprocessor personal computer and workstation systems to function in a multi-processor envoironment.

As the field of parallel processing advances, it becomes important to leverage off of existing low cost, off-the-shelf uniprocessors. This will enable cost effective and timely parallel products to be available at the marketplace. What is required to accomplish this is an efficient way to convert existing uniprocessors to function as parallel processors with minimal complexity and cost. This will enable customers to use idle processors that they already own more efficently and to add to the parallel system in a modularly growable fashion. Standard processor busses, such as the Microchannel, usually permit only small numbers (usually up to 8) devices to communicate before the bus exceeds its technology limits. In contrast to this, it is desirable to interconnect thousands of processors together as a parallel system. Certainly the interconnection mechanism for parallel systems cannot be the standard processor busses.

The state-of-the-art interconnection approaches have centered around multi-drop busses, which have many short comings, the primary of which is limited performance and expansion. The problem exists in bus-based processors that there is an ever increasing need for better I/O bus performance and the attachment of more I/O options. This is in direct conflict with the nature of a multi-drop bus technology, which loses performance as more and I/O options are added as taps to the bus. In general, standard bus architectures such as the MicroChannel (IBM Trademark) have selected a performance goal and thus limited the number of I/O taps permissable at that performance level. In the case of the MicroChannel the result is that 8 taps is the maximum number of allowable bus taps to permit bus operations to occur at 200 ns cycle times. As a result, bus-based system users are beginning to find that the I/O capability is not sufficient to meet their needs. For years people having been looking for means of increasing the I/O capability of bus-based systems.

Bus-based system performance is limited because only one user can have access to the bus at any given time. The expandability is limited because of the electrical characteristics of the multi-drop bus including drive capability, noise and reflections. A bus must be used internally for a Personal Computer (PC) or workstation, and cannot be extended outside of the packaging enclosure for the purpose of expanding the PC's or workstation's ability to increase it's I/O capability or to communicate directly with other PCs or workstations. Instead, an expansion card must be used internal to the PC or workstation and inserted into a card slot to interface with the internal bus and to provide a different interface for external expansion.

The present invention provides a means of using each bus-based machine as one node of a many noded parallel system. This is accomplished in either of two ways: 1) By interconnecting multiple PCs or workstations through an expansion card in each PC or workstation which connects to a high speed switching network and enables the individual bus-based systems to communicate with low-latency and interact as a parallel system. This allows for use of investment, yet it overcomes all the limitations placed upon a single bus-based architecture. 2) By interconnecting multiple bus-based cards by an active switch-based planar apparatus which adapts the existing bus interface to allow each card or sets of multiple cards to be interconnected via a high speed switching network . This allows the reuse of investment in expansion cards, yet it leads to a compact and low cost parallel system, while overcoming all the limitations placed upon a single bus-based architecture.

Thus, the present invention can be used to in either of two ways to expand either the computer I/O capability or to improve performance through parallel operation of multiple PCs or workstations being clustered together via a parallel, high speed network.

The state-of-the-art interconnection solutions for multiple PCs and workstations involve serial, high-latency Token Ring and Ethernet connections. However, they do not provide the parallel characteristics and low-latency concepts required for modern interconnect systems. The characteristics that are required include the ability to dynamically and quickly establish and break element interconnections, to do it cheaply and easily in one chip, to have expandability to many thousands of elements, to permit any length, non-calibrated interconnection wire lengths, to solve the distributed clocking problems and allow future frequency increases, and to permit parallel establishment and data transmittal over N switching paths simultaneously.

The distributed and fully parallel switch utilized herein to provide the required interconnect properties is the ALLNODE Switch (Asynchronous, Low Latency, inter-NODE switch), which is disclosed in U.S. Ser. No. 07/677,543 and adapted by the present invention to perform the switching of converted bus interfaces at low latencies and high bandwidths. The ALLNODE switch provides a circuit switching capability at high bandwidths, and includes distributed switch path connection set-up and tear-down controls individually within each switch—thus providing parallel set-up, low latency, and elimination of central point failures. We will further describe in the detailed description a way whereby the ALLNODE switch and the present invention can be used to solve the bus-based processor interconnection problem effectively.

Amongst the most commonly used networks for digital communication between processors are the Ethernet or Token Ring LAN networks. "Ethernet: Distributed Packet Switching for Local Computer Networks" Communication of the ACM, July 1976, Vol.19, No. 7, pp 393–404; and "Token-Ring Local Area Networks and Their Performance", W. Bux, Proceedings of the IEEE, Vol. 77, No.2, February 1989, pp 238–256; are representative articles which describe this kind of network, which provide a serial shared medium used by one node at a time to send a message to another node or nodes. The present invention is a replacement for this the Ethernet and Token-Ring networks that supports a parallel medium capable of multiple simultaneous transfers. U.S. Pat. No. 4,803,485—LAN COMMUNICATION SYSTEM, represents one LAN approach which use of the present inventions would replace. This patent describes a medium conversion adapter similar to the present invention, but for adapting various bus protocols to a communication system having multiple transmission media segments in a ring configuration, like a token ring or LAN. The present invention differs in that it adapts multiple transmission segments in an unbuffered multi-stage parallel transfer configuration, that gets latencies in the sub-microsecond range, rather than in the millisecond range of LAN's. This differences will be of value in the future.

SUMMARY OF THE INVENTIONS

The present invention is a conversion apparatus that converts and adapts standard processor bus protocol and architecture, such as the MicroChannel (IBM Trade mark) bus, to more progressive switch interconnection protocol and architecture. This way the older simplex processors and the investment in them are not lost, but expanded to be able to perform new parallel and clustering functions by enabling the interconnection of thousands of processors. Customers can buy existing processors or use ones they have purchased previously, and connect them in new and better ways to provide parallelism.

The conversion apparatus can have varying degrees of complexity, performance, and cost options to address a wider range of the marketplace. In general, the MicroChannel (MC) bus provides for various options permitting either Slave or Bus Master converters and/or expansion cards. There are a wide variety of MC cards in existence today and more being introduced everyday. The vast majority (about 90%) of these MC cards fall into 2 categories—I/O Slaves and Memory Slaves. Two other categories, Bus Masters and DMA Slaves, are not available today in nearly as large quantities. Therefore, the most leverage can be obtained by providing a conversion apparatus having the lower cost of using the popular I/O and Memory MC Slave capabilities. A conversion apparatus having Slave capabilitities is disclosed here as a low cost and practical approach. The Slave conversion apparatus is relatively easy to implement and inexpensive to build.

On the other hand, the second MC Bus Master option is much more complex and costly, entailing the most taxing of all expansion card functions to implement. However, it has better performance characteristics in some cases and would have its niche in the marketplace. The Bus Master option is disclosed in the related concurrent application entitled, "MASTER MICROCHANNEL APPARATUS FOR CONVERTING TO SWITCH ARCHITECTURE" by H. T. Olnowich etal.

In particular, the disclosed invention provides a means for extending the MicroChannel (IBM Trademark) Bus architecture to either massively parallel systems or thousands of I/O device taps or a combination of the two. This is accomplished by using electronic switches to interconnect various "MicroChannel Islands" (MI), where each MI is a unique MicroChannel (MC) that can be composed of 1 to 8 multi-drop bus taps (card slots), depending on how many card slots the particular planar, PC model, or workstation model implements. In other words, the new extended MicroChannel becomes a sea of a few or many MC multi-drop busses (MI's) interconnected to each other by a switching network. An expansion card or planar containing the present invention Slave MicroChannel Converter (MMC-S) unit is used to adapt each MI to the switch network. The result is that all MIs are fully interconnected and capable of sending data, communications, and/or messages between any two PCs or workstations, which become nodes of the parallel system. The communication media is switch-based and is fully parallel, supporting n transmissions simultaneously, where n is the number of nodes interconnected by the switching network.

The preferred switching means is the basic digital asynchronous and unbuffered switching concept disclosed in U.S. Ser. No. 07/677,543, "All-Node Switch, An Unclocked, Unbuffered Asynchronous Switching Apparatus" by H. T. Olnowich et al. The Allnode Switching apparatus provides a switching network communication structure that has the characteristic of simplicity of implementation, and does not require data buffering or data conversion of any kind. It establishes or breaks connections instantaneously and is, therefore, dynamically changeable with a very quick response time. It has the capability of resolving requests to establish connections in a parallel manner, where n connections can be established or broken at the same time (where n=the number of elements of the system which are communicating via the switching network). Thus, the number of connections that can be made or broken simultaneously scales directly with the size of the system. This capability enables the invention apparatus to handle multiple short messages very efficiently. In addition, the new apparatus is devoid of synchronization requirements or wire length restrictions. It also has the ability to track the speed improvements of new technologies and to increase performance as the technology used to implement the invention apparatus improves. In addition, the Allnode switching apparatus can be cascaded with other identical apparatus devices to form interconnection networks among any number of system elements or nodes. Said network would have the characteristics for full parallel interconnection.

BRIEF DESCRIPTION OF THE DRAWINGS

FIG. 18 shows a timing diagram of the conversion of MicroChannel protocol to the multi-stage switch network interface protocol.

DETAILED DESCRIPTION OF THE PREFERRED EMBODIMENTS

Disclosed here is both a 1) MICROCHANNEL BUS TO SWITCH ARCHITECTURE SLAVE CONVERTER CHIP, and 2) MICROCHANNEL BUS TO SWITCH ARCHITECTURE SLAVE CONVERTER expansion card. Either disclosed apparatus will enable MC based hardware to be efficiently coupled to other MC based hardware by permitting high speed switch interconnection amongst the microchannels of various processors. Thus, using the disclosed chip or expansion card will enable any MC based PC and/or workstation to connect via a switch network to any other MC based hardware. The logic functions required to make the electrical conversion from an existing and limited processor bus to a global switch network is disclosed herein.

The MMC-S invention can be packaged on either a chip or a card and will perform the same electrical conversion function. For today's market, the card is a very appropriate package. MICROCHANNEL BUS TO SWITCH ARCHITECTURE SLAVE CONVERTER logic, or the Switch Adapter (SA) for short, being available on the disclosed MC expansion card, makes it possible to customers to connect MC based machines to high speed, parallel, switch networks by merely purchasing a card an inserting it into their machine or machines, and cabling into the switch network which also must be purchased. The more detailed description of this invention is disclosed in the related concurrent application entitled, "SWITCH-BASED PERSONAL COMPUTER INTERCONNECTION APPARATUS" by H. T. Olnowich et al, IBM Docket EN9-92-0108B.

For future applications, existing processor packages will be compacted and a MICROCHANNEL BUS TO SWITCH ARCHITECTURE SLAVE CONVERTER chip will enable the MC to be adapted to switch networks using a smaller area and smaller cost factor based on a switch-based planar, as disclosed in the concurrently filed related application entitled, "SWITCH-BASED MICROCHANNEL PLANAR APPARATUS" by H. T. Olnowich et al, IBM Docket EN9-92-0108A.

Figure 1:
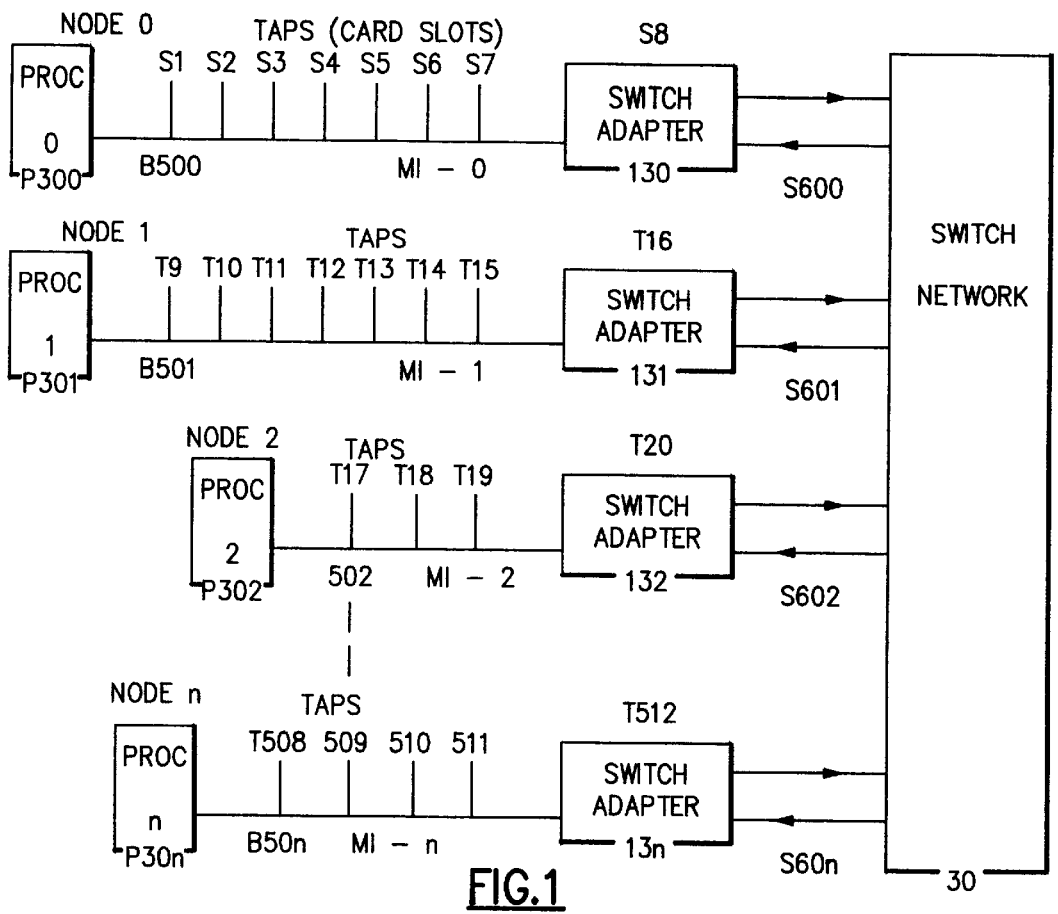
FIG. 1 illustrates generally our preferred embodiment of the present invention of multiple MicroChannel Islands which are multi-drop bus based connections, themselves being interconnected via the present invention which adapts each MicroChannel Island to a multi-stage switching network.

Turning now to the drawings in greater detail, FIG. 1, shows the preferred method of interconnecting n PCs and/or workstations as nodes of a parallel system via the multistage switch network 30. The entire system is composed of n individual nodes, where each node is comprised of a PC and/or work-station consisting of a processor with its associated MicroChannel I/O bus. Node 0 is comprised of processor P300 and MC Bus B500, Node 1 is comprised of processor P301 and MC Bus B501, Node 2 is comprised of processor P302 and MC Bus B502, and Node n is comprised of processor P30n and MC Bus B50n, where is theoretically an unbounded positive integer. Each MC Bus B500 to B50n is connected to an individual MicroChannel Converter unit, with MC bus B500 connecting to MCC 130, MC bus B501 connecting to MCC 131, MC bus B502 connecting to MCC 132, and MC bus B50n connecting to MCC 13n. These individual MC Busses are referred to as MicroChannel Islands, which are separate busses interconnected by a sea of switch network. Each MCC 130 to 13n has second and third interfaces which connect to an input and and ouput port, respectively, of unidirectional switch network 30.

A typical node is shown to consist of a variable number of card slots in the form of taps to/from the MC Bus, with the number of taps being individually selectable at each node and usually being between 1 to 8 taps per MC Bus, depending upon the PC or workstation model being used. The MCC 130 to 13n blocks represent MC expansion cards that require the usage of one of the cards slots on each MC Bus B500 to B50n. The remaining cards slots in each MC Bus B500 to B50n can be populated by any combination of standard MC expansion cards or left unoccupied.

The MCC 130 to 13n cards serves a bridge from the MC to the switch network having both MC and switch interfaces, and the MCC blocks implement the hardware which enables the MC and switch interfaces to work together to transfer data messages to and from the associated node to other nodes connected to switch network 30. The primary function of each MCC unit is to convert node address or memory addresses or I/O addresses presented by the initiating Micro-Channel into a means of locating the exact MI, where the the addressed processor, memory location, or I/O device resides. The MCC block then controls the transfer of data to the selected processor, memory location, or I/O device. The MCC also responds to any network transfers sent to it, and relays the transfer through the MC Bus to the proper destination—processor, memory location, or I/O device. At the destination, the adapter receives a transfer from the switch network and can either interrupt the proper destination tap on the destination MI, or arbitrate for the local MI and send the transfer directly to the addressed tap.

A typical data transfer from one node to another, for instance—node 0 to node 2, would include the following steps. The sending node 0 would communicate to its local microchannel bus B500 using standard microchannel bus sequences. MCC 130 would respond to these sequences and convert them to sequences and protocols which are understood by switch network 30 as communicated over interface S600. Thus, the communication from node 0 is passed over MC bus B500 to MCC 130, which converts the communication format and passes it on to the switch network 30 over interface S600. Switch network 30 is commanded by MCC 130 to form a connection to the receiving node 2, causing network 30 to pass the communication data through switch network 30 onto switch interface S602. The data is then received by MCC 132, converted back into a standard MC format, and passed over MicroChannel bus B502 to receiving node 2.

Interfaces S600 to S60n to and from switch network 30 provide an expansion interface for every PC or workstation, whereby it can communicate to processors, memory locations, and I/O devices which no longer need be resident on its own MicroChannel Island, but can be located anywhere within the interconnection range of switch network 30.

Figure 2:
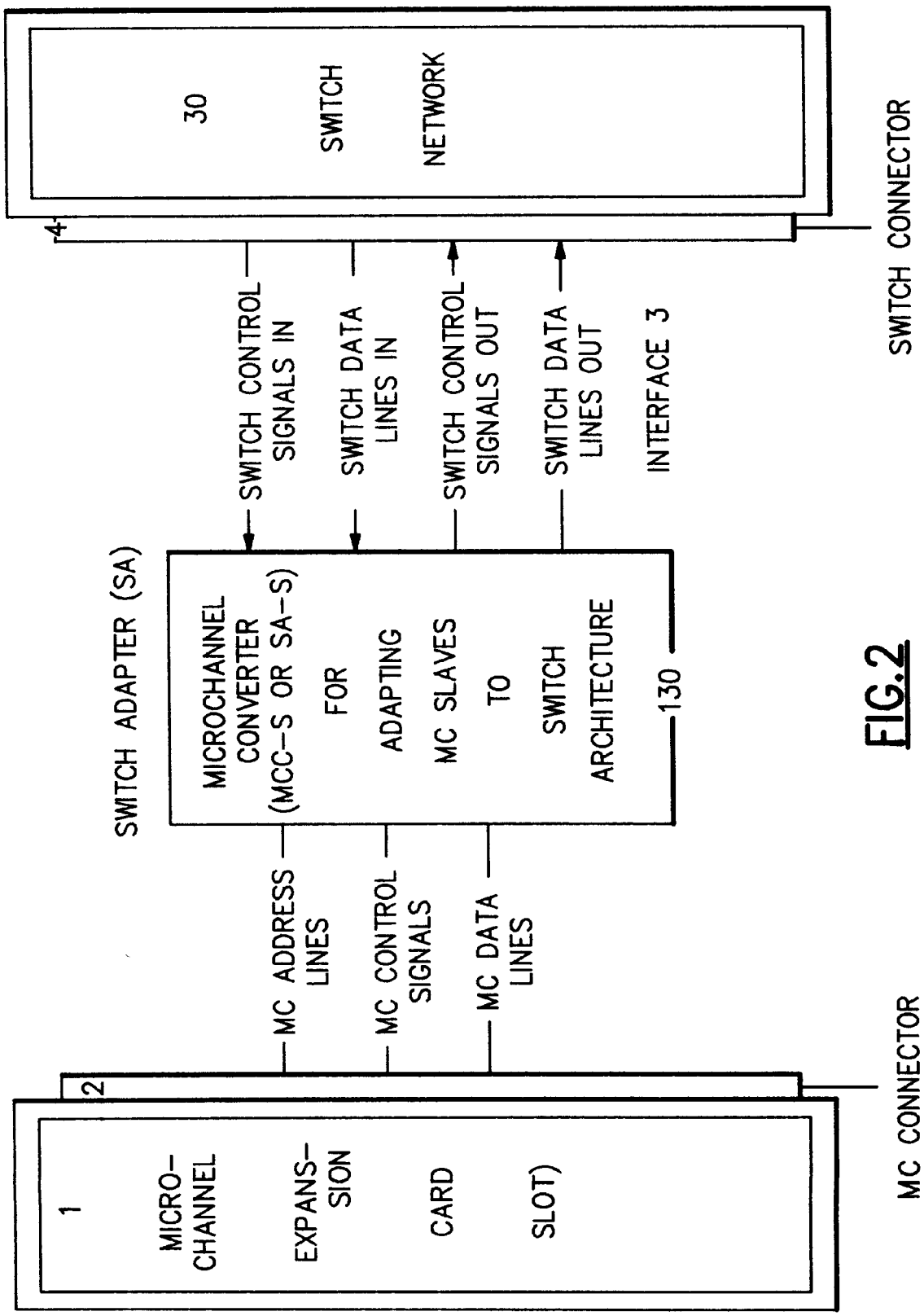
FIG. 2 illustrates generally our preferred embodiment of the present invention by showing a functional diagram of the adaption of MicroChannel interface signals to switch network interface signals.

FIG. 2 shows the preferred embodiment of the present invention of the MICROCHANNEL BUS TO SWITCH ARCHITECTURE SLAVE CONVERTER APPARATUS. Block 1 represents any standard MC based hardware, such as PCs or workstations, that present a MC connector 2 for expanding the features of the MC system by making available expansion card slots for inserting MC expansion cards. Block 130 presents the disclosed MICROCHANNEL BUS TO SWITCH ARCHITECTURE SLAVE CONVERTER logic (MCC-S) packaged on an SA expansion card for insertion into the MC, or packaged on a chip mounted on the concurrently disclosed SWITCH-BASED MICRDCHANNEL PLANAR APPARATUS. Block 30 represents a switch network capable of interconnection up to thousands of nodes to form a parallel system, where one typical node is represented by blocks 1, 2, and 130. The logic in block 130 converts the MC bus interface to allow it to communicate with the Switch Network 30. The communication is typically in the form of messages sent from the MC processor in block 1 to the MCC-S logic 130, then to the switch network 30 over the Data and Control OUT signals. Similarly, messages sent from other MC processors can arrive into block 130 from block 30 over the Data and Control IN signals. Incoming messages are received into block 130 and then sent to the MC processor in block 1.

Figure 3:
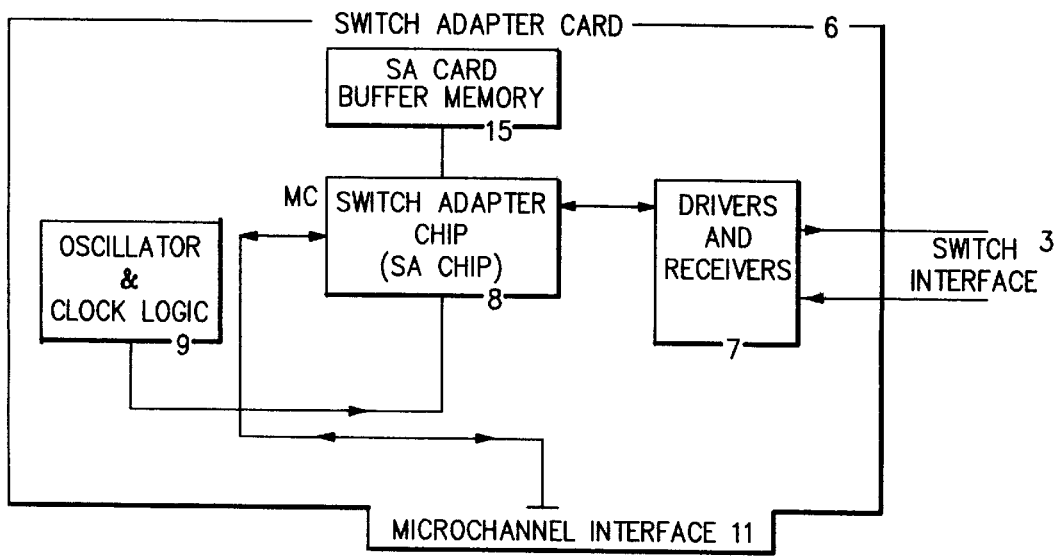
FIG. 3 illustrates our preferred embodiment of the functional layout of the present invention in relation to a disclosed Switch Adapter expansion card for insertion into a PC and/or workstation for the purpose of adapting the MicroChannel protocol and architecture to switch protocol and architecture.

Referring to FIG. 3, the approach shown is to combine the advantages of both the chip and card solutions by defining a SA expansion card 6 that has as its main component the MICROCHANNEL BUS TO SWITCH ARCHITECTURE SLAVE CONVERTER (MCC-S) chip 8, referred to as the SA chip 8, which is a chip containing the block 130 functions. FIG. 3 shows a layout of the SA Card 6 containing the SA chip 8 plus an oscillator 9, Memory Buffer 15, and driver/receiver parts 7. The SA Card 6 plugs into a standard MC expansion card slot, such as S8 of FIG. 1, via connector 11. In addition, SA card 6 provides a connector from the side of the card to switch interface 3. The SA Card 6 provides a way to connect individual PCs and/or workstations to switch network 30 as nodes.

Figure 4:
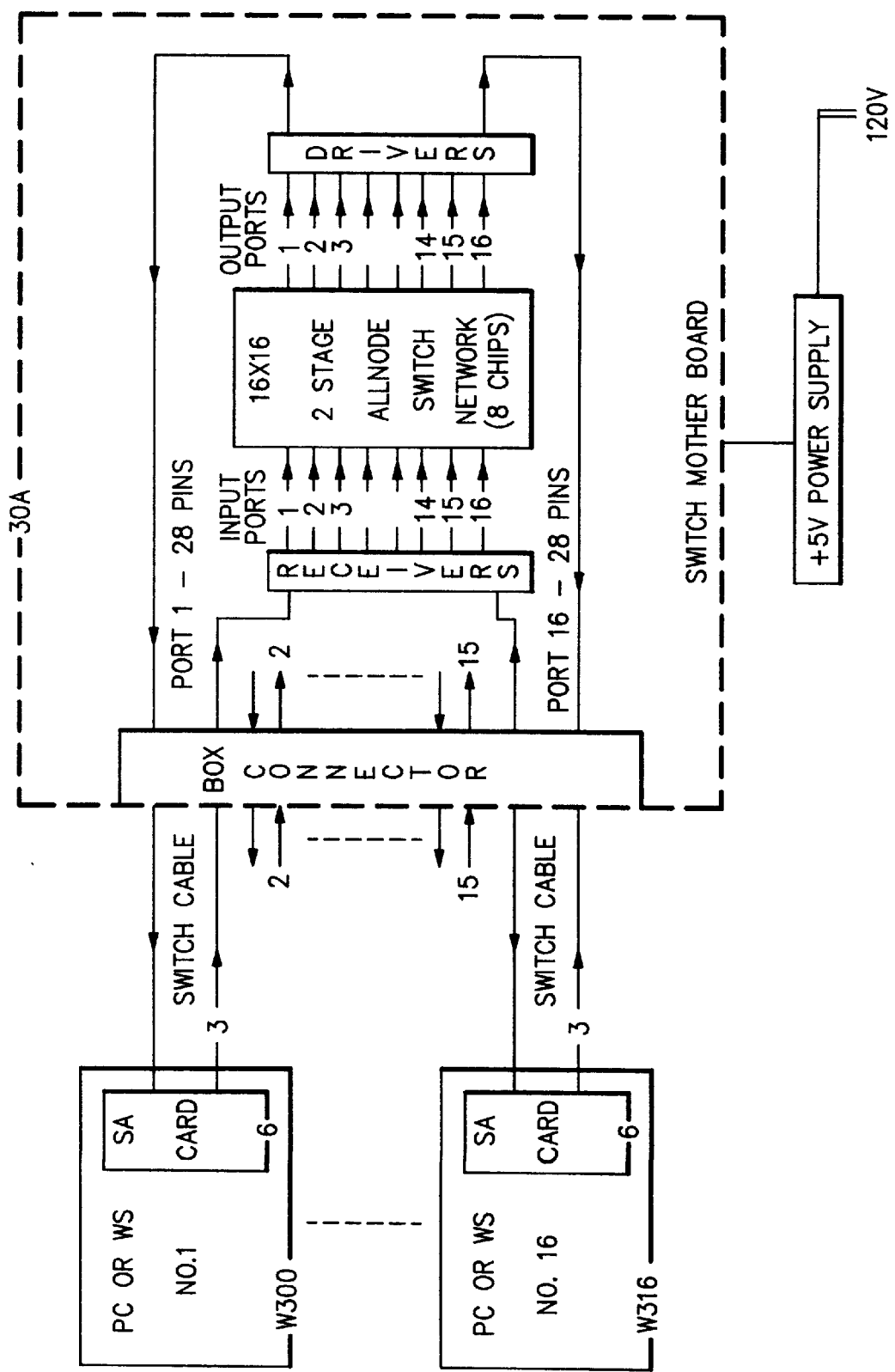
FIG. 4 illustrates our preferred embodiment of the use of functional the disclosed Switch Adapter expansion card for insertion into multiple PCs and/or workstations for the purpose of connecting the MicroChannel Islands to the switch network.

Typically, the switching network 30 of the parallel system is housed in a centrally located package. Referring to FIG. 4, consider the ALLNODE Switch Box as typical implementation of block 30 of FIG. 1. The Switch Box is capable of communicating with up to 16 PCs and/or workstations (blocks W300 to W316) to form a parallel processing system. A single Switch Box is capable of supporting full interconnection amongst up to 16 nodes using the network shown in FIG. 7. In addition, the Switch Box has the capability of being cascaded with other similar Switch Boxes to interconnect up to thousands of PCs and/or workstations.

Each PCs and/or workstation node W300 to W316 is individually connected to the Switch Box 30A through one SA Card 6 as shown in FIG. 3. The SA Card 6 is resident in every node W300 to W316 in one of the standard expansion card slots provided by that machine, and is used to make a connection to the Switch Box over a coax cable interface 3 of any length from 1 to 100 feet. The interface 3 requires 14 signals and 14 grounds. The cable interconnection provides two unique unidirectional 7-signal interfaces, one from the each node W300 to W316 to the Switch Box and one from the Switch Box to each node W300 to W316.

The distributed and fully parallel switch utilized in the preferred embodiment of the present invention the ALLNODE Switch (Asynchronous, Low Latency, inter-NODE switch), which is disclosed in U.S. Ser. No. 07/677,543 and adapted by the present invention to perform the switching of serial data lines at low latency and high bandwidths. The ALLNODE switch provides a circuit switching capability at high bandwidths similar to the switch fabric in the central matrix controlled switches; however, the ALLNODE switch includes distributed switch path connection set-up and tear-down controls individually within each switch—thus providing parallel set-up, low latency, and elimination of central point failures.

It is here understood that the FIGS. 5 to 11 are illustrations which are common to U.S. Ser. No. 07/677,543, the parent application which is incorporated herein by reference as to all of its contents. FIGS. 5 to 11 refer to a 4×4 crossbar implementation of the ALLNODE Switch to illustrate the principles and speed of the switching concept.

Figure 5:
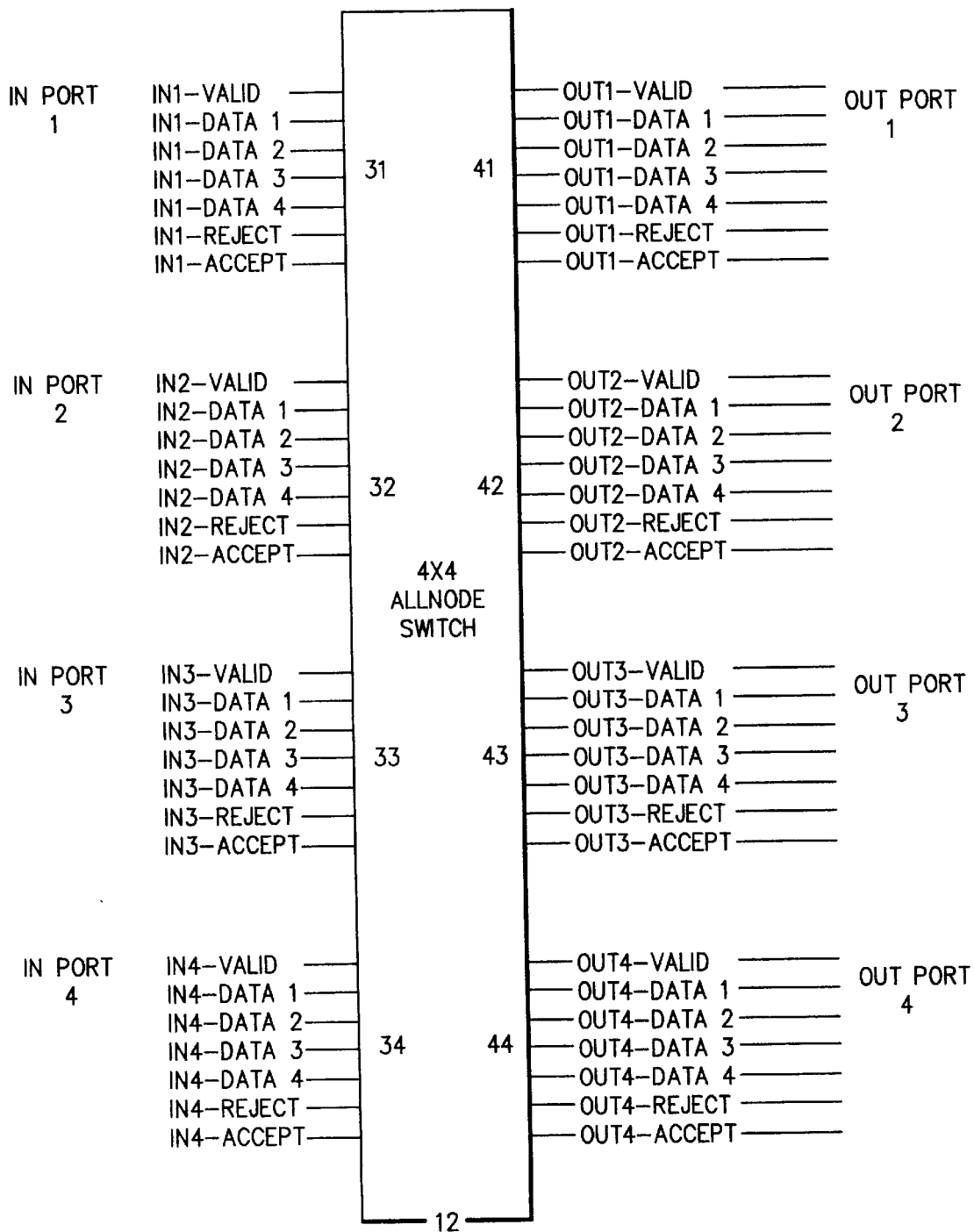
FIG. 5 illustrates a four input and four output (4x4) crossbar switching apparatus, which has the capability of providing the disclosed fully parallel switching means for interconnecting up to four nodes.

Referring to FIG. 5, the preferred embodiment is a 4×4 switching apparatus 12, where the function of the present invention is to provide a means of connecting any of 4 sets of input signals on a mutually exclusive basis to any one of the unused 4 output ports. The 4×4 switching apparatus 12 can support up to 4 simultaneous connections at any given time. For instance, Input 1 could be connected to Output 3, Input 2 to Output 4, Input 3 to Output 2, and Input 4 to Output 1.

The invention switching apparatus 12 is unidirectional, which means that data flows in only one direction across the said switching apparatus 12, that being from input to output. Switching apparatus 12 interfaces are defined in detail in FIG. 5. The set of lines 31, 32, 33, and 34 at each in-port to the switching apparatus 12 are identical in number and function to the set of lines 41, 42, 43, and 44 at each out-port. The sets of interface lines to each input and output port contain seven unique signals: 4 digital data lines, and 3 digital control lines (VALID, REJECT, and ACCEPT). The signals at each port are differentiated by a prefix of INX- or OUTX- indicating the direction and number of the port (X) that they are associated with. The four digital data and one VALID lines have a signal flow in the direction going from input to output across switching apparatus 12, while the digital REJECT and ACCEPT control lines have a signal flow in the opposite direction.

Each unidirectional switch interface 3 set requires only 7 signals, as shown in FIG. 2, to transmit and control and data through the network 30—the digital data and control transfer width is ½ byte (4 bits) at a time. The signals required are:

DATA: 4 parallel signals used to command switch connections and transmit digital data messages or digital control headers.

VALID: When active, indicates that a digital message, control header, or analog waveform is in the process of being transmitted. When inactive, indicates a RESET command and causes all switches to reset to the IDLE state.

REJECT: Signal flow is in the opposite direction from the DATA and VALID signals. When active, it indicates that a REJECT or error condition has been detected.

ACCEPT: Signal flow is in the same direction as the REJECT signal. When in the low state, it indicates that a message is in the process of being received and checked for accuracy. When active, it indicates the message has been received correctly.

Figure 6:
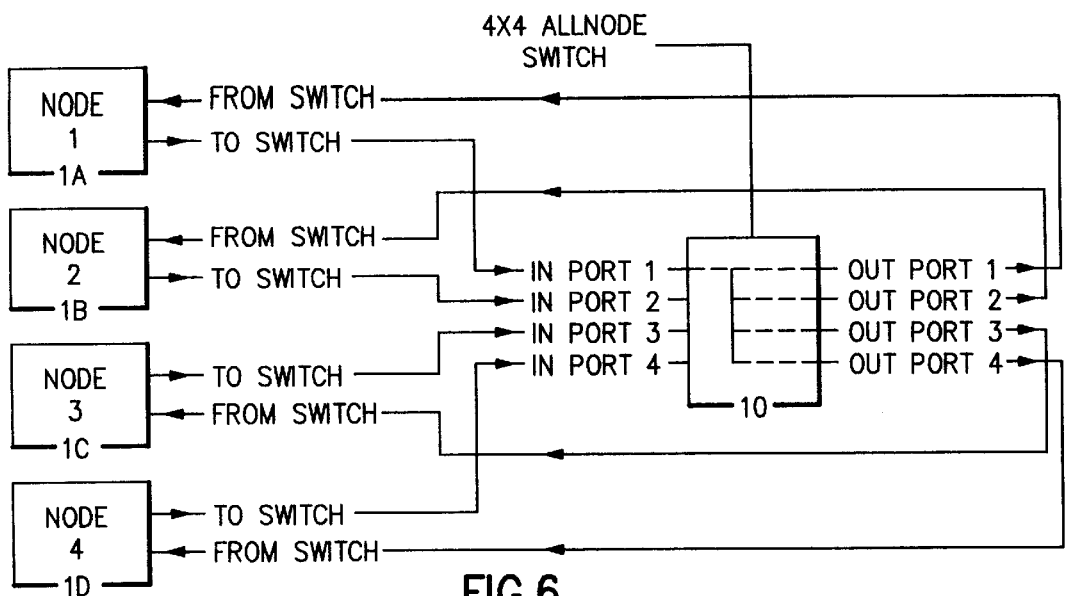
FIG. 6 illustrates the interconnections required to a four input and four output (4x4) crossbar switching apparatus to provide full interconnection amongst four nodes.

As illustrated by FIG. 6 the ALLNODE switching apparatus would be provided for a node having a plurality of input and output ports, and would comprise the connection control circuit for each input port, and a multiplexer control circuit for each output port for connecting any of I inputs to any of Z outputs, where I and Z can assume any unique value greater or equal to two, as in the parent application.

FIG. 6 shows a 4×4 crossbar ALLNODE switching apparatus, where the ALLNODE switching apparatus 10 is unidirectional, which means that data flows in only one direction across the said switching apparatus 10, that being from input to output. Although the said switch apparatus 10 is unidirectional, it supports bidirectional communication amongst four 140 nodes (20, 22, 24, and 26) by connecting the 4×4 ALL-NODE switching apparatus 10 as shown in FIG. 6. Each node 20, 22, 24, and 26 has two sets of unidirectional interconnecting wires, one going to the switch 10 and one coming from the switch 10. The dashed lines internal to the switching apparatus 10 indicate that the function of the said switching apparatus is to connect an input port such as INPUT PORT 1 to one of four possible output ports. The switching apparatus 10 provides exactly the same function for each input port, allowing it to be connected to any unused output port.

Figure 7:
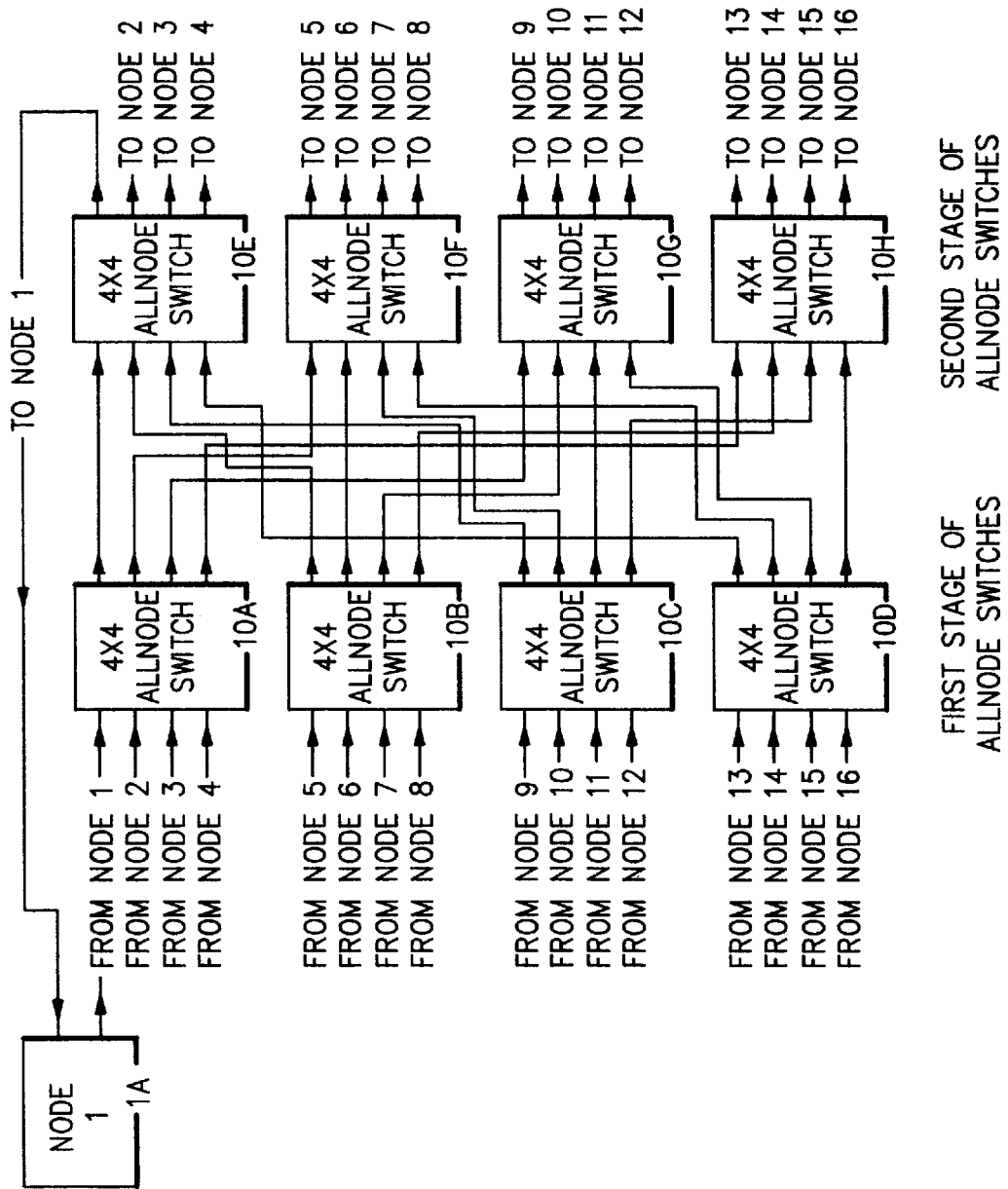
FIG. 7 shows a typical method for cascading the 4x4 disclosed embodiment of the invention switching apparatus to accomodate systems having more than 4 nodes.

Referring to FIG. 7, a method is illustrated for modularly increasing the number of nodes in a system by cascading eight switching apparatus 10 blocks. The eight cascaded switches are denoted as 10A through 10H to indicate that they are identical copies of switching apparatus 10, varying only in regards to the wiring of their input and output ports. It can be noted that any of sixteen nodes can communicate to any other node over a connection that passes through exactly two of the switching apparatus 10 blocks. For instance, Node 5 can send messages to Node 15 by traversing switch 10B and switch 10H. Since all connections are made through two switching apparatus 10 blocks, the network comprised of the eight switching apparatus 10 blocks is referred to as a two stage switching network. Other multi-stage networks can be configured from switching apparatus 10 blocks by using three stages, four stages, etc. in a similar manner. Thus, this network can be used to modularly increase the size of a parallel system comprised of PCs and/or workstations as nodes by simply changing the size of the switch network 30 and adding more PCs and/or workstations to interconnect to the expanded number of switch network ports.

Figure 8:
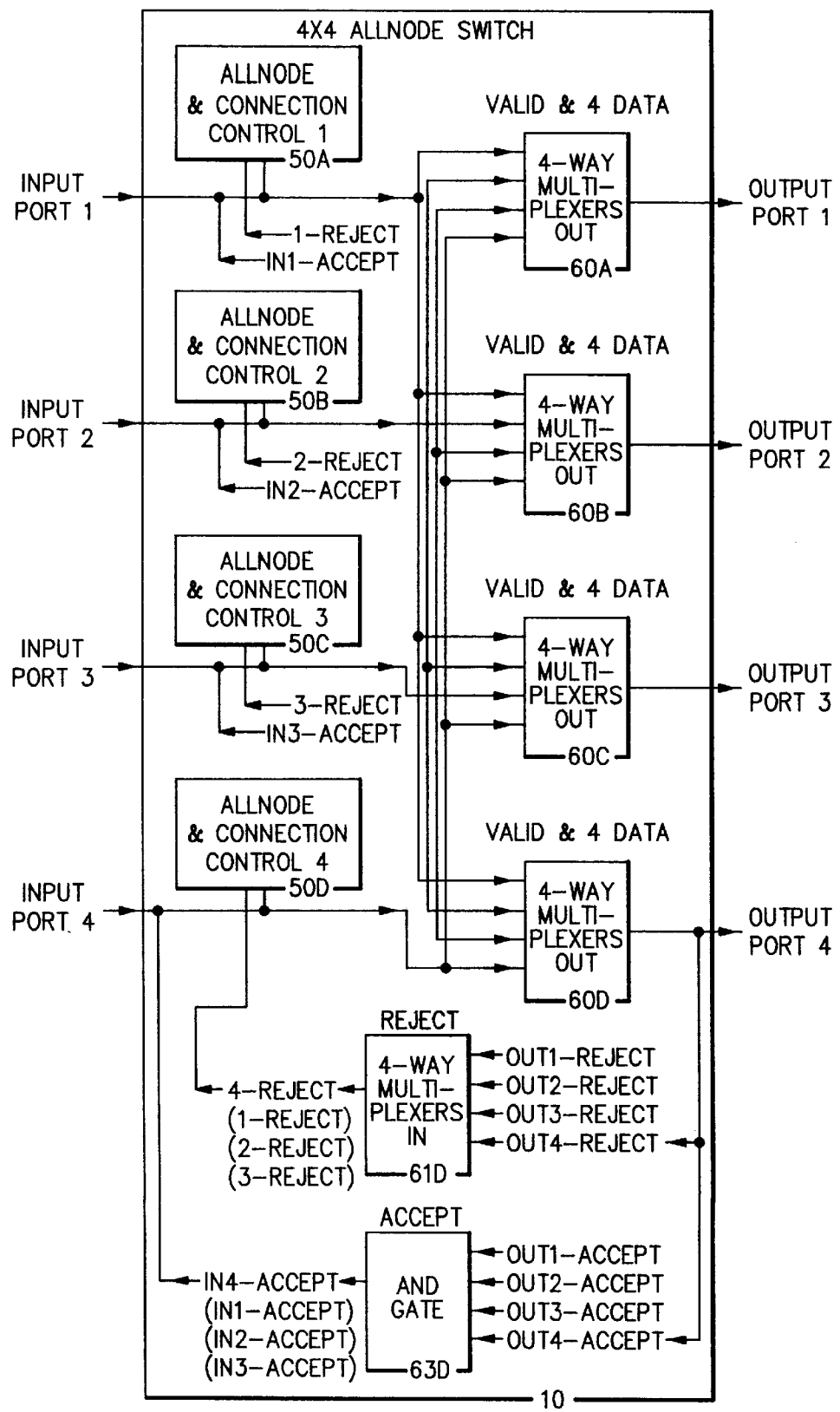
FIG. 8 shows a schematic block diagram of the simple digital data flow and control path implementations of the 4x4 crossbar switching apparatus, which has the capability of being used with the present invention to provide fully parallel switching means for interconnecting up to four system nodes for the purpose of transferring digital data.

Referring to FIG. 8, a functional diagram of the simple data flow across ALLNODE switching apparatus 10 is illustrated. The VALID and four data lines at each input port, inside the switch, and at each output port are represented by a single line in FIG. 8 for simplicity. For instance, the VALID and four data lines entering switch 10 at IN PORT 1 go to five internal functional blocks of switching apparatus 10; these are blocks 50A, 60A, 60B, 60C, and 60D. Block 50A makes the decision as to which of the four possible output ports are to be connected to input port 1. The VALID and four data lines from each input port go to each output multiplexer block (60A, 60B, 60C, and 60D); this makes it possible to connect any input port to any output port. Each of the four output multiplexer blocks (60A, 60B, 60C, and 60D) is uniquely commanded from each of the control blocks (50A, 50B, 50C, and 50D) as to which of the four possible sets of input port lines is to be gated through to each output port. For instance, control block 50A can command multiplexer 60C to connect input port 1 to output port 3; control block 50B can command multiplexer 60A to connect input port 2 to output port 1; and control block 50C can command multiplexers 60B and 60D to connect input port 3 in a multi-cast fashion to output port 2 and output port 4. All three connections are capable of being established simultaneously or at different times. At the same time that multiplexers 60A to 60D form connections to move the VALID and data signals across switch 10 with a unidirectional signal flow from input port to output port, multiplexer 61D and AND gate 63D form signal connections for the REJECT and ACCEPT signals, respectively, with a signal flow in the opposite direction of output port to input port (typical implementations are shown by blocks 61D and 63D—similar blocks are associated with each input port). These REJECT and ACCEPT signals provide a positive feedback indication to switch 10 of actions taken either by subsequent switch 10 stages in a cascaded network or by the device receiving and interpreting the VALID and four data signals. A control header or digital message being transmitted through switching apparatus 10 over the four data signals under control of the VALID signal can be REJECTed by any network stage if it is unable to establish the commanded connection or by the receiving device if it is not capable of receiving the message at this time or if it detects an error in the transmission. The receiving device also has the capability of confirming the correct arrival of a command or message (without errors being detected) by pulsing the ACCEPT signal. Since the REJECT and ACCEPT signals go in the opposite direction from the data flow, they provide a means of reporting back a positive indication to the sender on whether the attempted transmission was received correctly or rejected.

Figure 9:
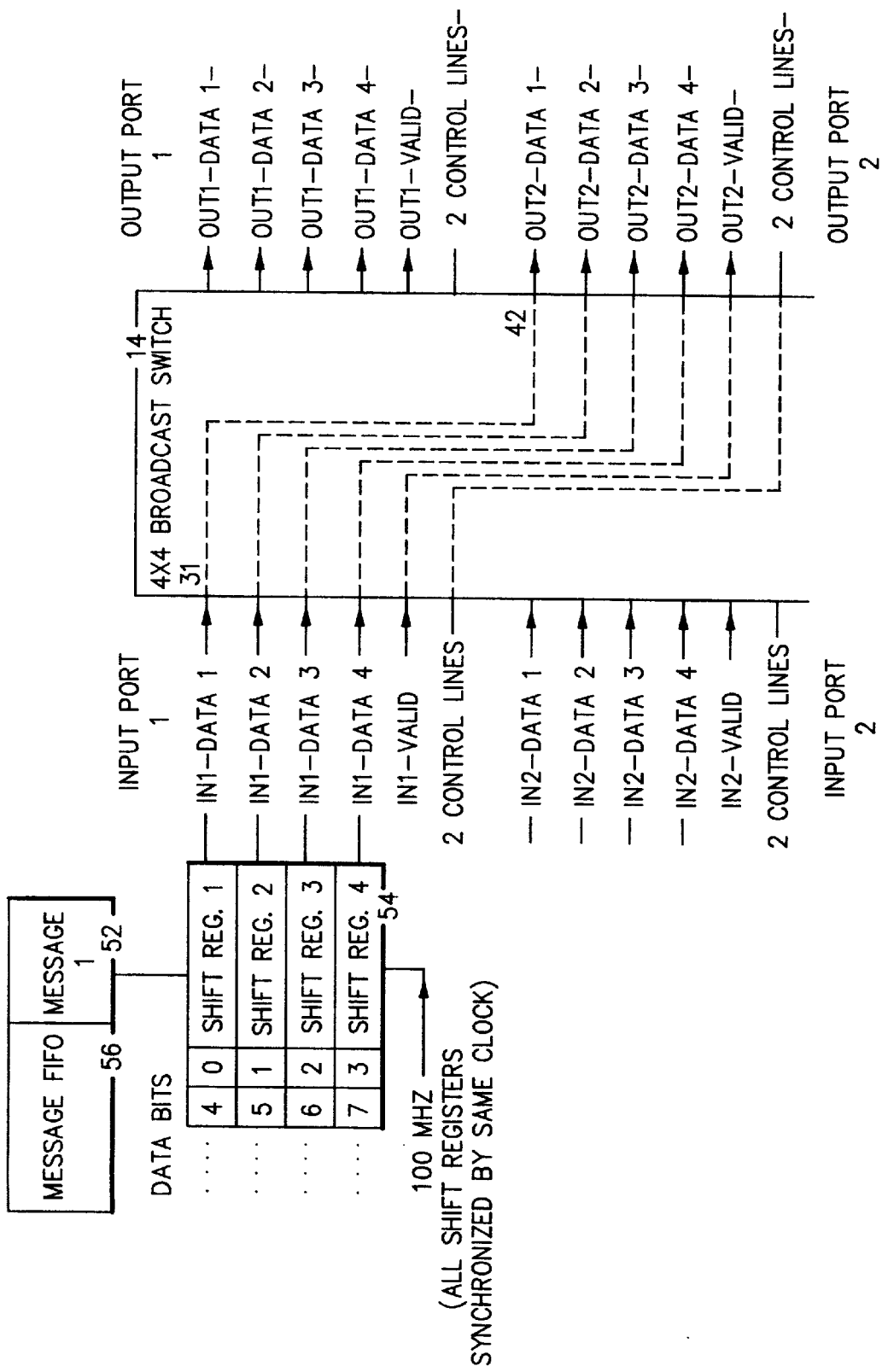
FIG. 9 illustrates a typical method for generating parallel control and and multiple line serial digital data information to be sent to the 4x4 prior parent embodiment of the invention switching apparatus over four synchronous data lines.

Referring to FIG. 9, blocks 56, 52, and 54 illustrate a typical method for generating multi-line (parallel)/serial digital data in the form of a message which can be transmitted to and across switching apparatus 14, which is a partial drawing of the switching apparatus 12. Similar parallel/serial data generation logic as provided by 56, 52, and 54 can be used at each of the other input ports to switching apparatus 12. Each set of input data lines provides 4 serial data lines to a given input port which is synchronized to the same clock by the four shift registers 54 which create the parallel/serial data by shifting four synchronized lines of data 31 as controlled by the same identical clocking signal (100 MHZ in FIG. 6). However, the four different input port sources (31, 32, 33, and 34) to switching apparatus 14 can be asynchronous to each other, being based on different, non-synchronized, 100 MHZ clocking signals.

The process for sending parallel/serial messages through switching apparatus 14 involves FIFO 56, which accumulates data messages to be transmitted. The next entire message to be transmitted is moved to buffer 52. The message stored in buffer 52 is moved to shift registers 54 in preparation for transmittal and the data is dispersed across the four shift registers 54 by placing data bit 0 into the first bit of shift register 1, data bit 1 into the first bit of shift register 2, data bit 2 into the first bit of shift register 3, data bit 3 into the first bit of shift register 4, data bit 4 into the second bit of shift register 1, etc. Shift registers 54 then begin to send serial data to switching apparatus 14 over four synchronized data lines, in such a manner that the parallel/serial data flows continuously until the entire message has been transmitted. The switch apparatus 14 uses the first eight bits transmitted (in the first two clock cycles of serial data over interface 31 from serial registers 54 to switching apparatus 14) to select and establish a connection path through the switching apparatus 14. The example in FIG. 9 illustrates via dashed lines, the switching apparatus establishing a temporary connection between input port 1 (31) and output port 2 (42), such that each of the eight individual lines in interface 31 are uniquely and directly connected to each of the corresponding lines in interface 42.

Figure 10:
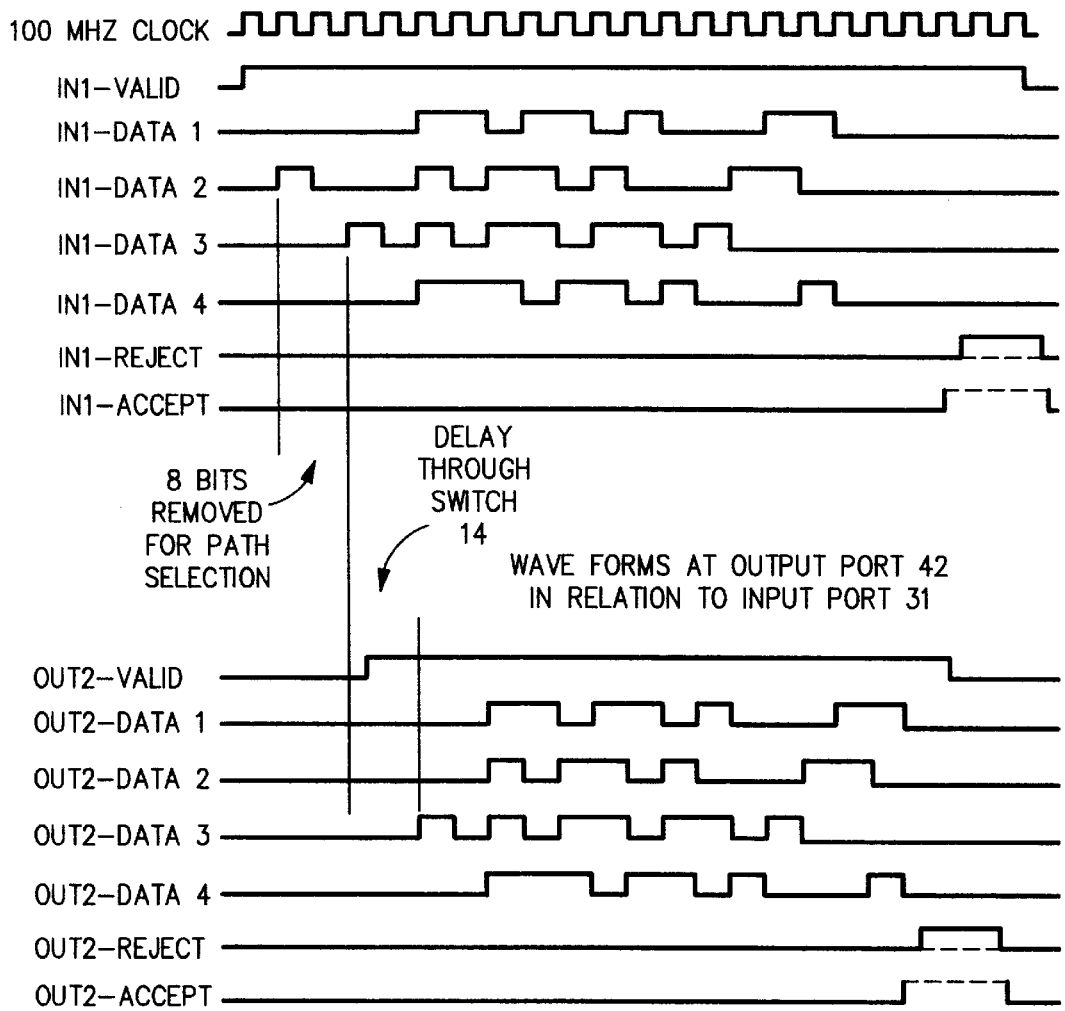
FIG. 10 shows a typical timing diagram for routing the digital interface signals arriving at one input port of the 4x4 prior parent embodiment of the invention switching apparatus to one output port.

Referring to FIG. 10, typical serial waveforms are shown for both input and output ports of the switching apparatus 14. The switch removes the first 8 bits of the serial transmission as sent by shift registers 54 and uses them to make and hold a connection, such as interface 31 to interface 42. The remainder of the serial message in our example is transferred directly from interface 31 to interface 42, so that interface 42 sees that exact same message that interface 31 receives, minus the first 8 bits and delayed by the circuit delays encountered by the serial data as it traverses the switching apparatus 14. Switching apparatus 14 does not buffer or re-clock the serial data entering via interface 31 in any manner; it merely reflects as quickly as possible the input waveforms it receives over interface 31 to output interface 42 without changing them in any way, except to strip off the first 8 bits.

The convention for indicating to a switch 14 input port over an interface (such as 31) that there is no transfer in progress, is to issue continuous IDLE commands, which are denoted by the 4 data lines and the VALID control line being held at logical 0's. The detection of a logical 1 on any of the input lines will signify the departure from the IDLE state and signify to the switch that a selection and transfer is beginning. Likewise, the output lines from the switch will be held in the IDLE state (at all 0's), when there is no active transfer in progress.

In general, all switches require a path selection method, whereby they are commanded which connection (input port to output port) to establish. For switching apparatus 10, the path selection command is transmitted to the switch over the same interface that the data is transferred; i.e., the 4 data lines associated with each input port. Selection information must be transferred prior to the data, so that the commanded interconnections can be established and the data can then flow to the commanded destination. The selection information need NOT identify an input port number (1 to 4), because it is arriving at the switch over a specific input and the switch already knows what input number it is receiving data on. Therefore, the selection information need ONLY specify the number (1 to 4) of which one of the four output ports of switching apparatus 10 to which to connect. The method of path selection recommended here is one out of N encoding with a return to zero (called a DEAD FIELD).

Figure 11:
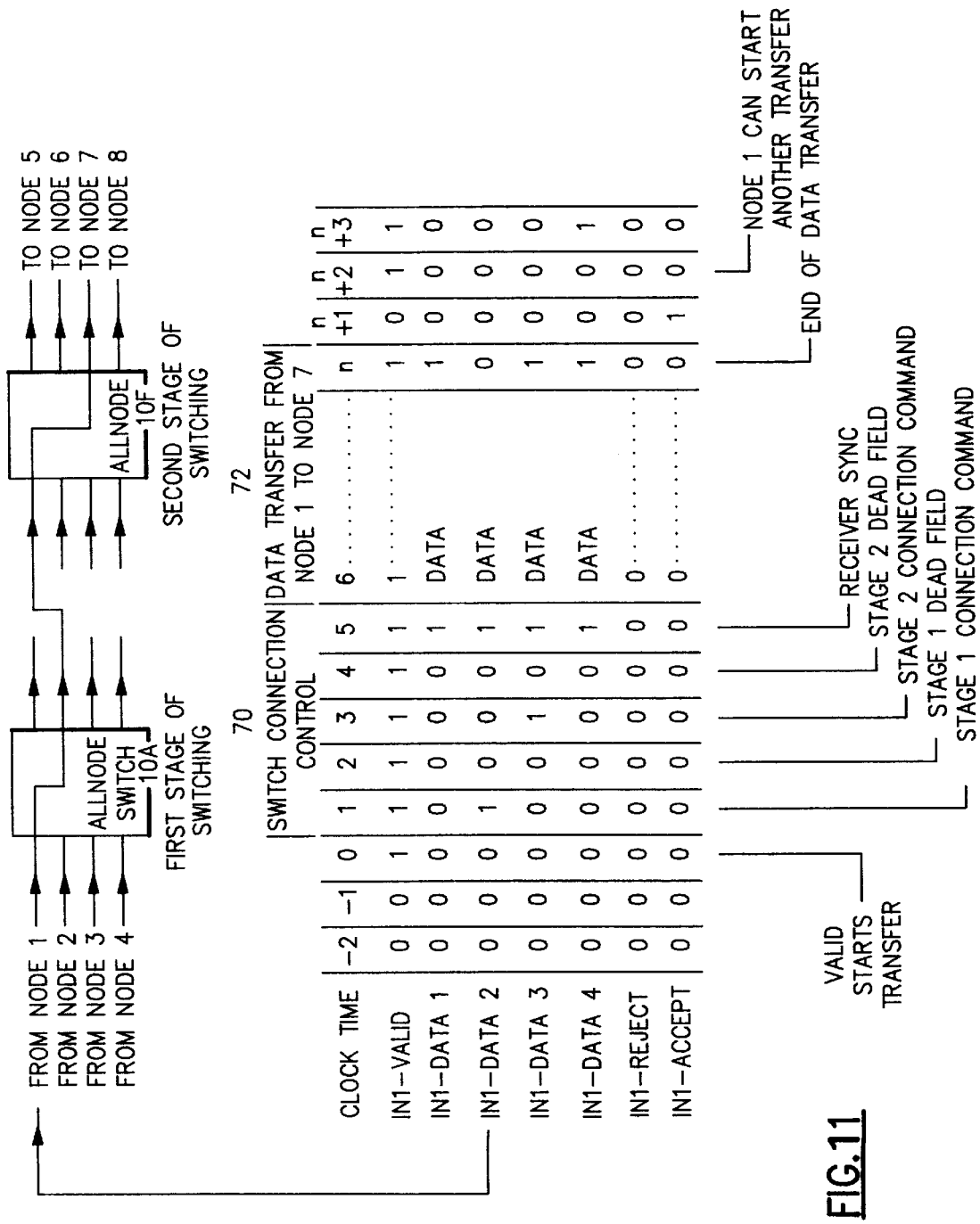
FIG. 11 illustrates the typical method of selecting and establishing a transmission path through a network comprised of the invention switching apparatus for the purpose of sending digital data from one node to another.

Referring to FIG. 11, a typical example of the exact serial bit patterns and control signal activation is shown for sending control and digital data information to switching apparatus 10. The example references the cascaded, two stage switching network shown in FIG. 7 and involves sending data across the network from node 1 through switching apparatus 10A and 10F to node 7. To make this connection, input port 1 must be connected to output port 2 of the first stage switching apparatus 10A, and input port 1 must be connected to output port 3 of the second stage switching apparatus 10F. The signal sequence that is sent to input port 1 to cause the desired connections in switching apparatus 10A and 10F is shown in FIG. 7. In the signal sequence of 1's and 0's, time advances from left to right, so that the values seen at clock time −2 arrive at switch 10A first, and the values at clock time −1 arrive second, etc. The values of the IN1-DATA and IN1-VALID lines are all zeroes and cause nothing to happen at switch 10A during times −2 and −1, because they indicate IDLE. At clock time 0, the IN1-VALID line goes to a logical 1. This prepares switch 10A by enabling the input port 1 to receive data, but no connection or action takes place at switch 10A at this time. The IN1-VALID control line basically enables the corresponding switch input port; when IN1-VALID is a logical 0, switch 10A cannot make any connections or receive any data from input port 1, which is held RESET. Finally, at clock time 1, switch 10A receives its command as to what output port to connect to; the command is received entirely during clock time 1.

The command bit pattern sent at clock time 1 is used by switch 10A to establish connection to an output port; this process is referred to as a path selection operation and takes place completely internal to switch 10A. The path selection approach implemented by the present ALL-NODE switch invention is to let each of the 4 IN1-DATA lines to define a unique output of switch 10A to be selected. For instance, IN1-DATA1 signal going to a logical 1 at time 1 tells switch 10A to connect to output port 1, IN1-DATA2 commands connection to output port 2, etc. In our example, since IN1-DATA2 goes to a logical 1 during clock time 1, switch 10A is thereby commanded to connect to output port 2. In other words, the connection algorithm is that the first data input line going to a logical 1 after an input port has been enabled, defines the connection which that input port is to make. This is a mutually exclusive process, in that for the normal case only one data line at clock time 1 is allowed to be a logical 1; the other 3 data lines must be 0's. Note that since 1 bit of selection information is guaranteed to be a logical 1, switch 10A will be able to recognize the start of a transmission without requiring any additional bits to signify that a transfer is commencing. The switch 10A makes the commanded connection by removing the 4 bits from the data lines and storing them in a selection register in control block 50A of FIG. 8. The bits transmitted during clock time 1 are not passed through switch 10A to switch 10F, but instead switch 10A begins passing the very next 4 bits of data corresponding to clock time 2 to the next switch 10F. However, the information bits following a selection command (those transmitted by the 4 data lines at clock time 2 in our example) must always be all zeroes (a DEAD FIELD) as shown in FIG. 11. The purpose of this will be explained subsequently.

At clock time 2, the connection of switch 10A input port 1 to output port 2 is established and causes the signal sequence at clock time 2 to be transmitted across switch 10A and the interconnecting wires to switch 10F input port 1. From this time on, switch 10A merely transmits all subsequent data immediately to switch 10F input port 1; it never examines or takes any action on any other data patterns presented to switch 10A over its input port 1 interface. It just passes all data patterns it receives over input port 1 immediately to the output port 2 and switch 10F. Thus, at clock time 2, assuming zero delay across switch 10A and its associated cable, switch 10F input port 1 sees the VALID signal rise and the all zeroes DEAD FIELD on the 4 data lines coming into switch 10F input port 1. In this way, at time 2, switch 10F input port 1 is enabled in an identical manner to the way switch 10A input port 1 was enabled previously at time 0.

In our example, IN1-DATA3 goes to a logical 1 during clock time 3 and switch 10F is thereby commanded to connect its input port 1 to its output port 3, in a manner similar to the way switch 10A was commanded to connect its input port 1 to its output 2 during clock time 1. The switch 10F in making the commanded connection, removes the 4 bits at clock time 3 from the data lines, and stores them in the selection register which is part of control block 50A of FIG. 5. The bits transmitted during clock time 3 are not passed through switch 10F to Node 7, but instead switch 10F begins passing the very next 4 bits of data corresponding to clock time 4 to Node 7. However, the information bits following a selection command (those transmitted by the 4 data lines at clock time 4 in our example) must always be all zeroes (a DEAD FIELD) as shown in FIG. 11. Thus, by clock time 4, switches 10A and 10F have established a connection path for transferring data directly from Node 1 to Node 7. Up to clock time 5, Node 7 sees nothing but IDLE commands. At time 4, Node 7 sees the OUT3-VALID line from switch 10F go active and is thereby enabled to start receiving data at time 5. From time 5 on, Node 7 can receive data from Node 1 over the 4 OUT3-DATA lines from switch 10F. The protocol of the actual data being transmitted can be any of the normal formats such as manchester encoded, 8/10 bit encoding with preamble, etc. However, the preferred embodient, as shown in FIG. 10 is an all ones synchronization field at time 5, followed by the NRZ data message. The data message can specify the word count length of the transfer. The purpose of the synchronization field of all ones as a prefix to the actual data message, is to enable the receiving node 7 to synchronize to the sending node 1 in one clock time. This assumes that the two nodes involved in the data transfer have clocking systems that are asynchronous to each other, but are operating at the same frequency within a specified tolerance.

The preferred embodiment is to transmit the word count length of the message first during clock time 6 and clock time 7. Node 7 then decrements the length count and can detect when the transfer is complete. Node 7 can then check the message for accuracy using the selected error detection method (parity, ECC, or CRC). If the message has been received correctly, Node 7 responds by activating the ACCEPT interface line back to switch 10F at clock times n+1 and n+2. Switch 10F passes the ACCEPT indication back to switch 10A, which in turn returns it immediately to Node 1. This indicates to Node 1 that the transfer completed successfully, and Node 1 resets its VALID and 4 data lines to switch 10A to zeroes, thus, completing the data transfer and returning to the IDLE state. The IN1-VALID input line to switch 10A going to a zero at time n+3, causes switch 10A input port 1 to break its connection to output port 2 and to return to the IDLE state. Immediately, switch 10F sees its IN1-VALID input line go to a zero, breaks its connection to output port 3 and returns to the IDLE state. Thus, the connections can be broken and the switches returned to IDLE in as little as one clock time. If Node 1 has another message to transmit, it can load the next message into buffer 52 and shift registers 54 (FIG. 6), and begin transmission to Node 7 or any other node as soon as time n+4. The only restriction is that the VALID signal generated by Node 1 must return to zero for a minimum of one clock time (time n+3) to signify the end of one transfer before beginning another.

If Node 7 finds an error in the message it has received after the word count has gone to zero at clock time n, it responds by activating the REJECT interface line (instead of ACCEPT) back to switch 10F. Switch 10F uses the incoming REJECT signal from Node 7 to break its connection to Node 7, to return to the IDLE state, and to pass the REJECT indication back to switch 10A, which in turn returns it immediately to Node 1 after breaking its connections and returning to IDLE. Node 1 then notes that the transfer has been rejected, and returns to the IDLE state by resetting its VALID and 4 data lines to switch 10A to zeroes. Node 1 may then retry the transmission by reloading shift registers 54 from buffer 52 and starting the transmission over again from the very beginning (clock time −1). The retransmission can occur over the identical path as the previously rejected transmission, or if alternate paths through the network are implemented another path can be tried. If continuous REJECTs are encountered, such that a specified number of REJECTs occur for the same message, an error reporting mechanism may be invoked.

It is also possible for any switch 10 in a network path to REJECT a message. This can occur for either of two cases:

1) BUSY—If the output port to which the switch is commanded to connect is BUSY (i.e., it is being used by a previously established connection), the switch will signify this condition to the input port issuing the command by activating the REJECT line back to the previous network stage or to the transmitter (if the first stage of the network detects BUSY). For instance, in the example shown in FIG. 8, if 10A had received a command at clock time −2 to connect input port 4 to output port 2, that connection would have been active when input port 1 requested to be connected to output port 2 at clock time 1. In this case, output port 2 is BUSY at clock time 1 and switch 10A would activate the IN1-REJECT line to Node 1. As described above, the transmitter may retry any REJECTed message.

Likewise, the connection could be made successfully at switch 10A, yet output port 3 of switch 10F could be BUSY at clock time 3, causing switch 10F to issue the REJECT signal to switch 10A. This, in turn, causes switch 10A to return REJECT immediately to Node 1 after breaking its connections and returning to IDLE.

2) Simultaneous CONTENTION—Rather than input port 4 establishing a connection to output port 2 in switch 10A at clock time −2 as described above (in advance of the same command from input port 1 at clock time 1), it is possible for two or more input ports to try to connect to the same output port at approximately the same time. This is called CONTENTION for an available output port. For instance, suppose input ports 1 and 4 both sent simultaneous commands at clock time 1 requesting to be connected to output port 2. The present invention resolves this contention by first connecting both contending input ports 1 and 4 to output port 2. The net effect is to electrically connect the 2 input ports to output port 2, which will logically OR the signals coming from both sources. During clock time 2 the logical OR of the 2 input ports will NOT cause an error, because the values present on both input ports 1 and 4 are identical: the VALID lines for each are logical 1's and the data lines for each contain the DEAD FIELD (logical 0's). However, at clock time 3, the signals from each source could be different and an error could be caused if the 2 input ports both remained connected at clock time 3 and later. In other words, switch 10A has 1 cycle time (clock time 2) to correct the decision it made to connect two or more inputs to the same output. Switch 10A makes this correction during clock time 2 by detecting the fact that more than one input is connected to a given output. It then takes action by resetting all but one of the multiple connections, and does this before clock time 3 occurs. The decision of which connection(s) to reset and which one to keep is a decision based on priority. For the preferred embodiment, a simple priority scheme is used as follows: If input port 1 is contending it gets the connection, If input port 1 is not contending and input port 2 is, input port 2 gets the connection. If input ports 1 and 2 are not contending and input port 3 is, input port 3 gets the connection. Input port 4 gets the connection only if no other input port wants it. Applying the priority selection to our example, input port 1 gets to keep its connection to output port 2, while the connection of input port 4 to output port 2 is reset during clock time 2. This results in the REJECT signal being issued in the normal fashion from switch 10A to input port 4.

Thus, the purpose of the DEAD FIELD in the present invention is to allow one clock time per switch stage to resolve simultaneous contention. The secondary purposes of the DEAD FIELD are to cause a falling edge on the selection bit which was active during the previous clock time, and to compensate for timing skew which might be present across the 4 data lines carrying serial selection data to the cascaded switches. Both the rise and fall of data bits commanding the switches to make connections gives the unclocked switch two clock edges (rise and fall) on which it can trigger and make decisions. These are the only two decision making times available to the ALL-NODE switch.

Data in the form of a message may be sent via switch network 30 from any node connected to network 30 to any other node connected to network 30. The destination of each message is specified by a destination ID number indicating which node is to receive the message. The destination ID (DID) number is equal to the physical node number of the node attached to the network and is independent of the source of the message. For instance, any node 1 to 16 wishing to send a message to node 10, sends the message to DID=10. The DID is used to route the message to the correct path in the network, so that it arrives at the proper destination only (in this case, node 10). The DID is the binary representation of the destination node number segmented into two two-bit binary values to form the routing information for the network, with each two-bit value being decoded and sent over the 4 DATA lines as a Stage Connection Command for controlling the routing of one stage of the switch network, as shown in FIG. 11. The values occur in 2-bit coded groups because two bits are required to select one of the four possible output ports at each 4×4 switch 10. For instance, for the two-stage network shown in FIG. 7, the four-bit binary representation for destination ID number 10 is (10,01), where the first 2 bits (10) indicate the output port that is to be selected in switch stage 1; and the second two bits indicate (10) as the output port that is to be selected in switch stage 2. If, as an example, node 1 wishes to send a message to node 10, the output port selected in switch stage 1 would be the third output port down on the right hand side of the switch 10A (corresponding to the selection value for stage 1 (10)). Node 1 forms a connection through switch 10A to the first input port of switch 10G of FIG. 7. Next switch 10G is commanded to make the connection to its second output port via the second 2-bit binary value (01)— where node 10 is located. Thus, the connection from node 1 to node 10 is completed, based only on the binary representation of the destination DID number if the node numbering starts with node 0, or the destination DID number minus 1 if the node numbering starts with node 1.

The present invention connects MC Slave interfaces to switch network 30 interfaces. Turning now to the MC Slave interfaces, the MicroChannel Architecture consists of:
An arbitration bus and associated signals
An address bus and associated signals
A data bus and associated signals
Interrupt signals
Other &mclong signals
Optional extensions for:
  Matched memory extension signals
  Video extension signals.

The SA-S Card 6 implements all of the MC signals required to support operation as a Memory or I/O slave, with 32 and 64-bit data streaming capability. The preferred embodiment does not implement the optional extensions for matched memory and video.

Throughout this dislosure, a minus sign (–) in front of a signal name indicates that the signal is active when it is at a low voltage or down level. When no minus sign appears, the signal is active when it is at a high voltage or up level. For example, –CMD specifies the signal is active low. Also, ARB/–GNT is in the ARB state when it is at a high level and is in the –GNT state when it is at a low level.

Arbitration Bus and Associated Signals

The arbitration bus and associated signals allow arbitrating participants (the system master, bus masters, and DMA slaves) to request and gain ownership of the channel. The resolution of multiple arbitration requests results in granting ownership of the channel to the highest-priority requester.

ARB0–ARB3: Arbitration Bus: These signals make up the arbitration bus. They are driven by the system master, bus masters, and DMA slaves to present their arbitration level when requesting ownership of the channel. ARB0 (least significant) through ARB3 (most-significant) support up to 16 arbitration levels.

The highest value of the arbitration bus (X'F') has the lowest priority, and the lowest value (X'0') has the highest priority. To participate in the arbitration procedure, an arbitrating participant must present its arbitration level immediately after the rising edge of ARB/–GNT. All arbitrating participants monitor the arbitration bus, and those with lower priority arbitration levels withdraw them by not driving less-significant arbitration bits.

The arbitration level of the highest-priority requester is valid on the arbitration bus after a settling time. After the channel is granted to the highest-priority requester, that requester continues to drive its arbitration level on the bus.

ARB/–GNT: Arbitrate/–Grant: Only the central arbitration control point drives this signal, but it is monitored by all arbitrating participants. The negative-to-positive transition of ARB/–GNT initiates an arbitration cycle. When in the ARB state, this signal indicates an arbitration cycle is in progress. When in the –GNT state, this signal indicates the acknowledgement from the central arbitration control point to the arbitrating participants and the DMA controller that channel ownership has been granted. This signal is driven to the ARB state by the central arbitration control point following the end of transfer (EOT).

Note: The system master can perform data transfers during arbitration (ARB/–GNT in the ARB state).

–BURST: –Burst: This signal is optionally driven by the winning arbitrating participant or the DMA controller after ARB/–GNT is driven to the –GNT state. This signal indicates to the central arbitration control point that the controlling master will use the channel for one or more consecutive data transfer cycles. This type of data transfer is called burst transfer.

–PREEMPT: –Preempt: This signal is used by arbitrating participants to request use of the channel through arbitration. Any arbitrating participant that requires ownership of the channel drives –PREEMPT active, causing an arbitration cycle to occur. When a participant is granted control of the channel, it stops driving –PREEMPT. All arbitrating participants that have not been granted ownership keep their requests pending by continuing to drive –PREEMPT active. All masters and DMA slaves that use burst transfer must receive –PREEMPT.

Address Bus and Associated Signals

The address bus and the associated signals are used by the controlling master to assert the memory address or the I/O address (M/–IO), to enable a slave to latch the address and status signals (–S0, –S1), and to indicate that the memory address is greater than 16 MB.

A0–A23 Address Bits 0 through 23: These lines, along with A24 through A31, make up the address bus. The lines are driven by the controlling master to address memory, I/O slaves, and, optionally, DMA slaves. A0 is the least-significant bit and A23 is the most-significant bit. These 24 address lines allow access of up to 16 MB of memory. Only the lower 16 address lines (A0 through A15) are for I/O operations, and all 16 lines must be decoded by the I/O slave. A0 through A23 are generated by the controlling master. Valid addresses, generated by the controlling master, are unlatched on the channel and, if required, must be latched by the slaves using either the leading or trailing edge of –ADL or the leading edge of –CMD.

A24–A31 Address Bits 24 through 31: (32-Bit Extension) These lines, along with A0 through A23 are driven by the controlling master to address memory attached to the channel. A0 is the least-significant bit and A31 is the most-significant bit. These additional address lines allow access of up to 4 GB of memory. A24 through A31 are generated by the controlling master. Valid addresses, generated by the controlling master, are unlatched on the channel and, if required, must be latched by the slaves using either the leading or trailing edge of –ADL or the leading edge of –CMD.

Note: A0–A31 are used to transfer data during a 64-bit streaming data cycle, but the prototype &smu does not implement this feature.

–ADL –Address Decode Latch: This signal, driven by the controlling master, is provided as a convenient way for the slave to latch valid address decodes and status bits.

–APAREN –Address Parity Enable: (32-Bit Extension) This optional signal is driven active by a master when the master places an address on the bus. This signal indicates to a slave that the address parity signals are valid. The SA Card 6 supports generation and checking of the address bus parity bits.

APAR0–APAR3 Address Parity Bits 0 through 3: (32-Bit Extension) These optional signals are driven by a master when an address is placed on the address bus. These signals represent the odd parity of the address bits on the address bus during both read and write operations. (Odd parity is the condition where the total number of ones in a byte of data, including the parity bit, is odd.)

APAR(0) represents the odd parity of A(0–7).
APAR(1) represents the odd parity of A(8–15).
APAR(2) represents the odd parity of A(16–23).
APAR(3) represents the odd parity of A(24–31).

During both read and write operations, a master generates a parity bit for each valid address byte, and the receiving slave optionally performs the parity checking to ensure the integrity of the address. The &smu supports generation and checking of the address bus parity bits.

Note: APAR0–APAR3 represent data parity during 64-bit streaming data cycles when –DPAREN is active.

APAR(0) represents the odd parity of D(32–39).
APAR(1) represents the odd parity of D(40–47).
APAR(2) represents the odd parity of D(48–55).
APAR(3) represents the odd parity of D(56–63).

–CD SFDBK (n) –Card Selected Feedback: This signal is driven active by the selected slave as a positive acknowledgement of the slave's selection. The (n) indicates this signal is unique to each channel connector (one independent signal per connector). This signal is unlatched and driven by the selected slave. The slave does not drive –CD SFDBK during the configuration procedure (–CD SETUP active).

Note: Memory that contains diagnostic code must not drive –CD SFDBK during the diagnostic operation.

MADE 24 Memory Address Enable 24: This signal is driven by the controlling master and decoded by all memory slaves, regardless of the size of their address-space. When this signal is active, A24–A31 are undefined.

A master driving only A0–A23 drives MADE 24 active.
A master driving A0–A31 drives MADE 24:

active when all bits in A24–A31 are 0 inactive when any bit in A24–A31 is 1.

M/–IO Memory/–Input Output: This signal is driven by the controlling master and decoded by all slaves. This signal selects a memory cycle or an I/O cycle. When this signal is in the M state, a memory cycle is selected. When this signal is in the –IO state, an I/O cycle is selected.

–SFDBKRTN –Selected Feedback Return: (32-Bit Extension) This optional signal is generated by the system logic from the AND of the –CD SFDBK (n) signals being driven by slaves. This signal is a positive acknowledgement to the master from the slave that the slave is at the address specified by the master. Masters that support address parity must receive this signal.

Address Signal Combinations

The following tables show the valid addressing signal combinations for:
the address bus (A0–A23 and A24–A31)
M/–IO
MADE 24
APAR(0–3).

| | 16-Bit Connector | 32-Bit Connector | |
|---|---|---|---|
| Addressing Signals | 24-Bit Address | <16 MB Address | ≧16 MB Address |
| M/–IO | 1 | 1 | 1 |
| MADE 24 | 1 | 1 | 0 |

-continued

| | | | |
|---|---|---|---|
| A0–A23 | Valid | Valid | Valid |
| APAR0–APAR2 (Optional) | N/A | Valid | Valid |
| A24–A31 | N/A | X | Valid |
| APAR3 (Optional) | N/A | X | Valid |

| Addressing Signals | 16-Bit Connector | 32-Bit Connector |
|---|---|---|
| M/–IO | 0 | 0 |
| MADE 24 | X | X |
| A0–A15 | Valid | Valid |
| APAR0–APAR1 (Optional) | N/A | Valid |

X—Don't Care
N/A—Not applicable

Data Bus and Associated Signals

The data bus is used to transfer either 8, 16, 24, or 32 bits of data. The associated signals indicate the amount of data transferred by the master in a single transfer cycle, the size of the slave's data port, and the type (read or write) of the data transfer.

D0–D15 Data Bits 0 through 15: These lines, along with D16–D31, make up the data bus. The data bus is driven by any master or slave that is transferring data. These lines (D0–D15) provide data bits 0 through 15. D0 is the least-significant bit; D15 is the most-significant bit. The 16-bit transfers from the controlling master to an 8-bit slave are converted by the controlling master to two 8-bit transfers, and are transmitted on lines D0 through D7. An 8-bit slave must use D0 through D7 to communicate with the controlling master.

D16–D31 Data Bits 16 through 31: (32-Bit Extension) These lines, along with D0–D15, make up the data bus. The data bus is driven by any master or slave that is transferring data. These lines (D16–D31) provide data bits 16 through 31. D0 is the least-significant bit; D31 is the most-significant bit. The 32-bit transfers from the controlling master to an 8-bit slave are converted to four 8-bit transfers by the controlling master, and are transmitted on lines D0 through D7. The 32-bit transfers from the controlling master to a 16-bit slave are converted to two 16-bit transfers by the controlling master, and are transmitted on lines D0 through D15.

–BE0 to –BE3: –Byte Enable 0 through 3: (32-Bit Extension) These signals are used during data transfers with 32-bit slaves to indicate which data bytes are valid on the data bus. Data transfers of 8, 16, 24, or 32 contiguous bits are controlled by –BE0 through –BE3 during transfers involving 32-bit slaves only. These signals are driven by the controlling master when TR 32 is inactive, and by the central translator logic (for those operations involving a 16-bit master with a 32-bit slave) when TR 32 is active. These signals are not latched on the bus and, if required, are latched by 32-bit slaves.

–CD DS 16 (n) –Card Data Size 16: This signal is driven by 16-bit and 32-bit slaves to indicate a 16-bit or 32-bit data port at the location addressed. The (n) indicates this signal is unique to each channel connector (one independent signal per connector). This signal is derived from a valid unlatched address decode. –CD DS 16 is not driven by 8-bit slaves and is inactive for an 8-bit data port.

–CD DS 32 (n) –Card Data Size 32: (32-Bit Extension) This signal, along with –CD DS 16, is driven by 32-bit slaves to indicate a 32-bit data port at the location addressed. The (n) indicates this signal is unique to a channel connector position (one independent signal per connector). –CD DS 32 is derived from a valid unlatched address decode. –CD DS 32 is inactive for an 8- or 16-bit data port.

CD CHRDY (n) Channel Ready: This signal is normally active (ready) and is driven inactive (not ready) by a slave to allow additional time to complete a channel cycle. The (n) indicates this signal is unique to each channel connector (one independent signal per connector). During a read cycle, a slave ensures that data is valid within the time specified after releasing the signal to a ready state. The slave also holds the data long enough for the controlling master to sample the data. A slave can also use this signal during a write cycle, if more time is needed to store the data. This signal is initially driven from a valid unlatched address decode and status active.

CHRDYRTN Channel Ready Return: This signal is the AND of CD CHRDY (n). It is driven by the system logic. If all slaves drive CD CHRDY active, this signal is active. CHRDYRTN allows the controlling master to monitor the ready information.

−CMD −Command: This signal is driven by the controlling master and is used to define when data on the data bus is valid. The trailing edge of this signal indicates the end of the bus cycle. This signal indicates to the slave how long data is valid. During write cycles, the data is valid as long as −CMD is active. During read cycles, the data is valid after the leading edge, but before the trailing edge, of −CMD and is held on the bus until after −CMD goes inactive. Slaves can latch address and status information with the leading edge of −CMD.

DPAREN −Data Parity Enable: This optional signal is driven active by the participant when data is placed on the data bus. This signal indicates that the data parity signals are valid. The SA Card 6 supports generation and checking of the data bus parity bits.

Note: APAR(0)–APAR(3) represent data parity during 64-bit streaming data cycles when −DPAREN is active.

DPAR0–DPAR1 Data Parity Bits 0 and 1: These optional signals are driven by the participant when data is placed on the data bus. These signals represent the odd parity of the data bits on the data bus during both read and write operations. (Odd parity is the condition where the total number of ones in a byte of data, including the parity bit, is odd.)
DPAR(0) represents the odd parity of D(0–7).
DPAR(1) represents the odd parity of D(8–15).

During write operations, a master generates a parity bit for each data byte being transferred, and the receiving slave optionally performs the parity checking to ensure the integrity of the data. During read operations, a slave generates a parity bit for each valid data byte, and the receiving master performs the parity checking to ensure the integrity of the data. The SA Card 6 supports generation and checking of the data bus parity bits.

DPAR2–DPAR3 Data Parity Bits 2 and 3: (32-Bit Extension) These optional signals are driven by the participant when data is placed on the data bus. These signals represent the odd parity of the data bits on the data bus during both read and write operations.
DPAR(2) represents the odd parity of D(16–23).
DPAR(3) represents the odd parity of D(24–31).

During write operations, a master generates a parity bit for each data byte being transferred, and the receiving slave optionally performs the parity checking to ensure the integrity of the data. During read operations, a slave generates a parity bit for each valid data byte, and the receiving master performs the parity checking to ensure the integrity of the data. The SA Card 6 supports generation and checking of the data bus parity bits.

−DS 16 N −Data Size 16 Return: This signal is driven by the system logic. This signal is the AND of −CD DS 16 (n) from each channel connector. If any slave drives its −CD DS 16 active, this signal is active. This signal allows the controlling master to monitor the information about the selected slave's data port size.

−DS 32 RTN −Data Size 32 Return: (32-bit Extension) This signal is driven by the system logic. This signal is the AND of −CD DS 32 (n) from each channel connector. If any slave drives its −CD DS 32 active, this signal is active. This signal allows the controlling master to monitor the information about the selected slave's data port size.

| −DS 16 RTN | −DS 32 RTN | Data Port Size |
|---|---|---|
| 1 | 1 | 8-Bit Data Port |
| 1 | 0 | Not Valid |
| 0 | 1 | 16-Bit Data Port |
| 0 | 0 | 32-Bit Data Port |

−MSDR −Multiplexed Streaming Data Request: This signal is driven by a slave to indicate to the controlling master that the slave is capable of 64-Bit streaming data transfers.

−SBHE −System Byte High Enable: This signal is driven by the controlling master to indicate and enable transfers of data on D8–D15. It is used with A0 to distinguish between high-byte transfers (D8–D15) and low-byte transfers (D0–D7) and double-byte (16-bit) transfers to 16-bit data ports. All 16-bit slaves receive this signal.

−SD STROBE −Streaming Data Strobe: The controlling master and the slave use this signal to clock data on and off the data bus. This optional signal is driven by the controlling master. This signal also indicates to the slave that the controlling master supports streaming data.

−SDR(0) −Streaming Data Request 0: This optional signal is driven by a slave to indicate to the controlling master that the slave is capable of streaming data, and also indicates the maximum clocking rate the slave supports.

−SDR(1) −Streaming Data Request 1: (32-Bit Extension) This optional signal is driven by a slave to indicate to the controlling master that the slave is capable of streaming data, and also indicates the maximum clocking rate the slave supports.

| −SDR(0) | −SDR(1) | Decoded Streaming Rate |
|---|---|---|
| 1 | 1 | Basic Transfer Cycle |
| 0 | 1 | 10 MHz maximum (100 nS minimum cycle) |
| 1 | 0 | Reserved |
| 0 | 0 | Reserved |

−S0, −S1 −Status 0, −Status 1: These status signals are driven by the controlling master to indicate the start of a data transfer cycle and also to define the type of data transfer. When used with M/−IO, memory read or write cycles are distinguished from I/O read/write cycles. These signals are latched by the slave, as required, using the leading edge of −CMD, or the leading or trailing edge of −ADL. Data is transferred to or from the data bus based on −CMD and a latched decode of the address, the status lines (−S0 exclusive-OR −S1), and M/−IO. Slaves must support a full decode of &−S0 and −S1. The following table shows the states of M/−IO, −S0, and −S1 in decoding I/O and memory read and write commands.

| M/–IO | –S0 | –S1 | Function |
|---|---|---|---|
| 0 | 0 | 0 | Reserved |
| 0 | 0 | 1 | I/O Write Command |
| 0 | 1 | 0 | I/O Read Command |
| 0 | 1 | 1 | Inactive |
| 1 | 0 | 0 | Reserved |
| 1 | 0 | 1 | Memory Write Command |
| 1 | 1 | 0 | Memory Read Command |
| 1 | 1 | 1 | Inactive |

An I/O write command instructs an I/O slave to receive the data from the data bus. An I/O read command instructs an I/O slave to drive its data onto the data bus.

A memory write command instructs a memory slave to receive the data from the data bus. A memory read command instructs a memory slave to drive its data onto the data bus.

–TC –Terminal Count: This signal is driven by the DMA controller and provides a pulse during a read or write command to the DMA slave to indicate that the terminal count of the current DMA channel has been reached. This indicates to the DMA slave that this is the last cycle to be performed. –TC is driven active on the channel during DMA operations only.

TR 32 Translate 32: (32-Bit Extension) This signal is driven inactive by 32-bit controlling masters and received by the central translator logic. The signal indicates to the central translator logic that the controlling master is performing data steering. TR 32 can also be received by any 32-bit slave.

Interrupt Signals

–IRQ 3 to 7, –IRQ 9 to 12, and –IRQ 14 & 15 –Interrupt Request: An interrupt request is generated when an I/O slave drives one of the 'interrupt request' signals low. These signals make up the set of interrupt signals. The polarity of these signals makes it possible for multiple slaves to concurrently share the same interrupt level.

Other &mclong. Signals

AUDIO Audio Sum Note: This analog signal is the sum of all the audio signals being driven. It is used to drive audio signals from an adapter to the system audio output and between adapters.

AUDIO GND Audio Ground: This is the analog ground return signal for the audio subsystem.

–CD SETUP (n) –Card Setup: This signal is driven by the system logic to individually select channel connectors. The (n) indicates this signal is unique to each channel connector (one independent signal per connector). When this signal is activated, a specific channel connector is selected, and, if an adapter is present, access is gained to configuration data at that connector. The adapter ID and configuration data is obtained by an I/O read during a setup cycle; the configuration data is stored by an I/O write during a setup cycle.

–CD CHCK –Channel Check: This signal is driven active by a slave to report an exception condition, and optionally, it can be driven by a master.

CHRESET Channel Reset: This signal is generated by the system logic to reset or initialize all adapters at power-on or when a low voltage condition is detected. The system can also activate this signal under program control.

OSC Oscillator: This signal is a high-speed clock driven by the system logic, with a frequency of 14.31818 MHz±0.01%. The high-level pulse width (more than 2.3 Vdc) and the low-level pulse width (less than 0.8 Vdc) must not be less than 20 nanoseconds each.

–REFRESH –Refresh: This signal is driven by the system logic and is used to indicate that a memory refresh operation is in progress. Memory slaves that do not need to perform refresh operations do not need to receive this signal.

Figure 12:
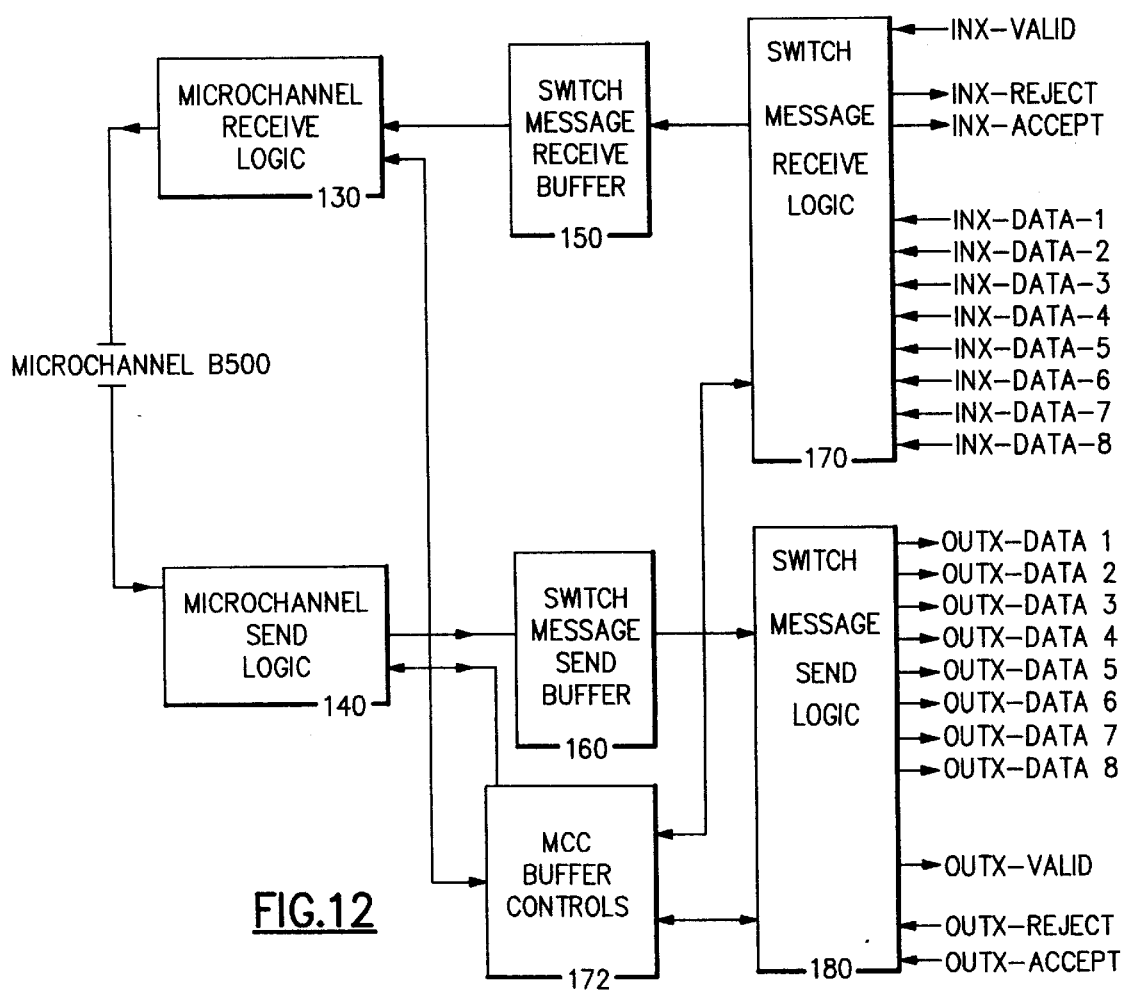
FIG. 12 shows a schematic block diagram of the perferred embodiment of the invention MicroChannel Converter or Switch Adapter function, for the purpose of adapting the MicroChannel protocol and architecture to switch protocol and architecture.

Referring to FIG. 12, a more detailed functional diagram of the disclosed MICROCHANNEL BUS TO SWITCH ARCHITECTURE SLAVE CONVERTER APPARATUS (block 130 of FIG. 1) is shown. The processor 300 residing on the MC Bus and performing as a node in a parallel system can transmit data messages to other nodes by sending memory or I/O transfers to the SA Card 6 over the MC. The SA Card implements MC Send logic 140 to respond to the MC as a Memory or I/O slave device, and to receive data messages and control commands addressed to it by processor P300. The SA Card 6 receives and stores the data message from the processor, and then relays the data message over switch network 30 to the requested destination node. The data message from the local processor is stored in the Switch Message Send Buffer 160 until it is received in full, then the Switch Message Send logic 180 reads the data message from buffer 160 and sends it over the parallel switch network 30 to the commanded destination. If the data message in buffer 160 is a SA Control Message containing control data for the SA Card 6 instead of a message for switch network 30, it is routed to and processed by block 172. Block 180 implements a switch output port which sends 4-bit wide data to the switch network 30, and becomes an input port to an ALLNODE Switch 10 in network 30. The corresponding output from the switch network 30 is connected to Switch Message Receive Logic 170, which acts as a switch output port from the network 30 and receives data messages from the network 30. The message received from the network is stored as is in the Switch Message Receive Buffer 150 until it is received in full, then the MC Receive Logic 130 sets a status bit or issues an interrupt to the local processor informing it that a message is waiting in the Receive-Buffer to be read. The Processor responds by sending memory or I/O Programmed Input/Output (PIO) operation addressed to the SA Card 6 over the MC, and reads the data message from the Receive-Buffer.

Figure 13:
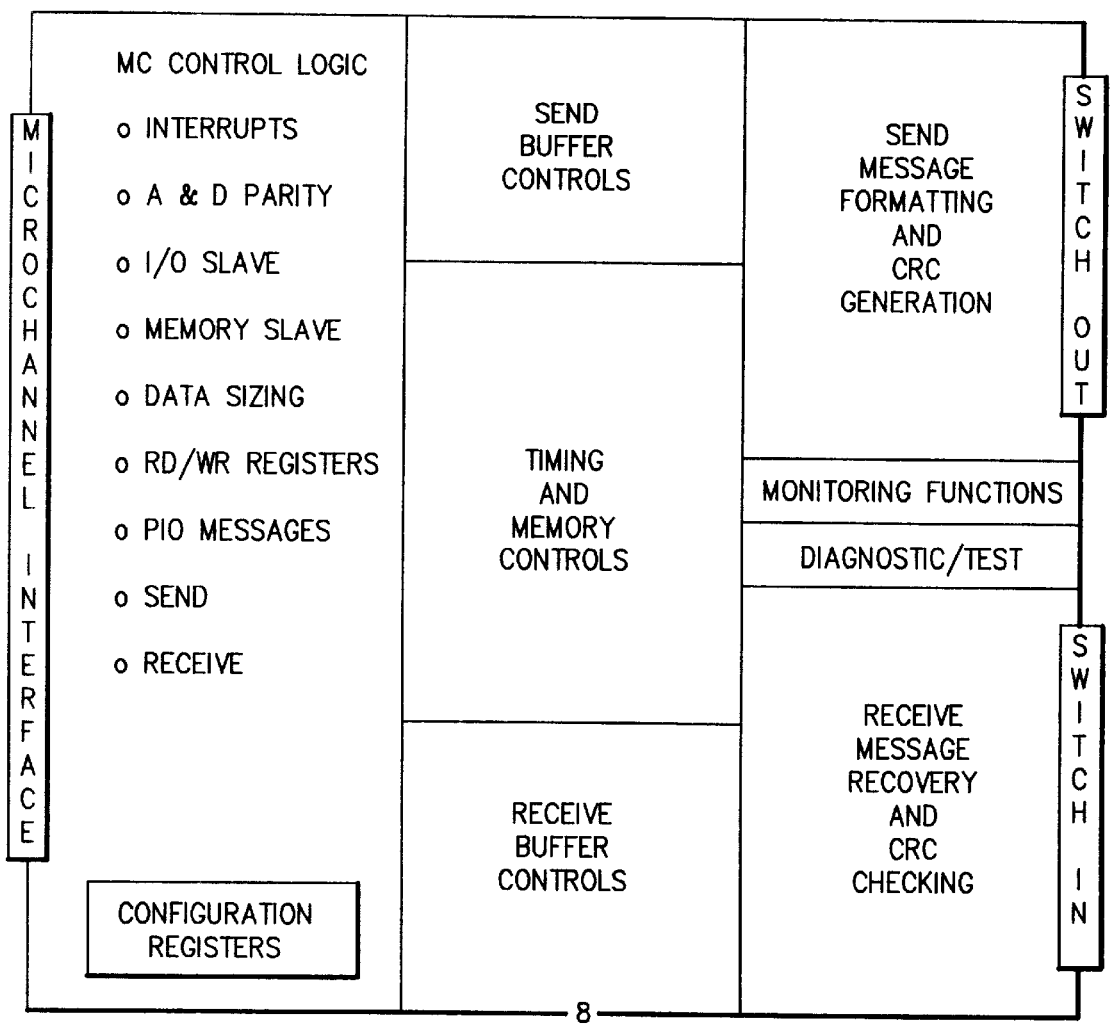
FIG. 13 shows a schematic block diagram of a chip layout to perform the invention MicroChannel Converter or Switch Adapter function, for the purpose of adapting the MicroChannel protocol and architecture to switch protocol and architecture.

Referring to FIG. 13, a chip floor plan is shown for the disclosed MICROCHANNEL BUS TO SWITCH ARCHITECTURE SLAVE CONVERTER CHIP 8. The chip contains the Microchannel Receive Logic 130 and Microchannel Send Logic 140 from FIG. 12 in the MC CONTROL LOGIC sub-block of chip 8. This block provides all the MC slave functions to support normal MC slave operations including interrupts, error detection, data sizing, control and configuration registers, and PIO message passing capability. Also included in chip 8 are chip timing and control functions, control logic for both the send and receive buffers (which are located external to the chip as shown in FIG. 3 by block 15), and diagnostic functions. Finally, there is one section of the chip dedicated to generating and sending messages to switch network 30, and another section dedicated to recovering and receiving data messages from switch network 30.

Figure 14:
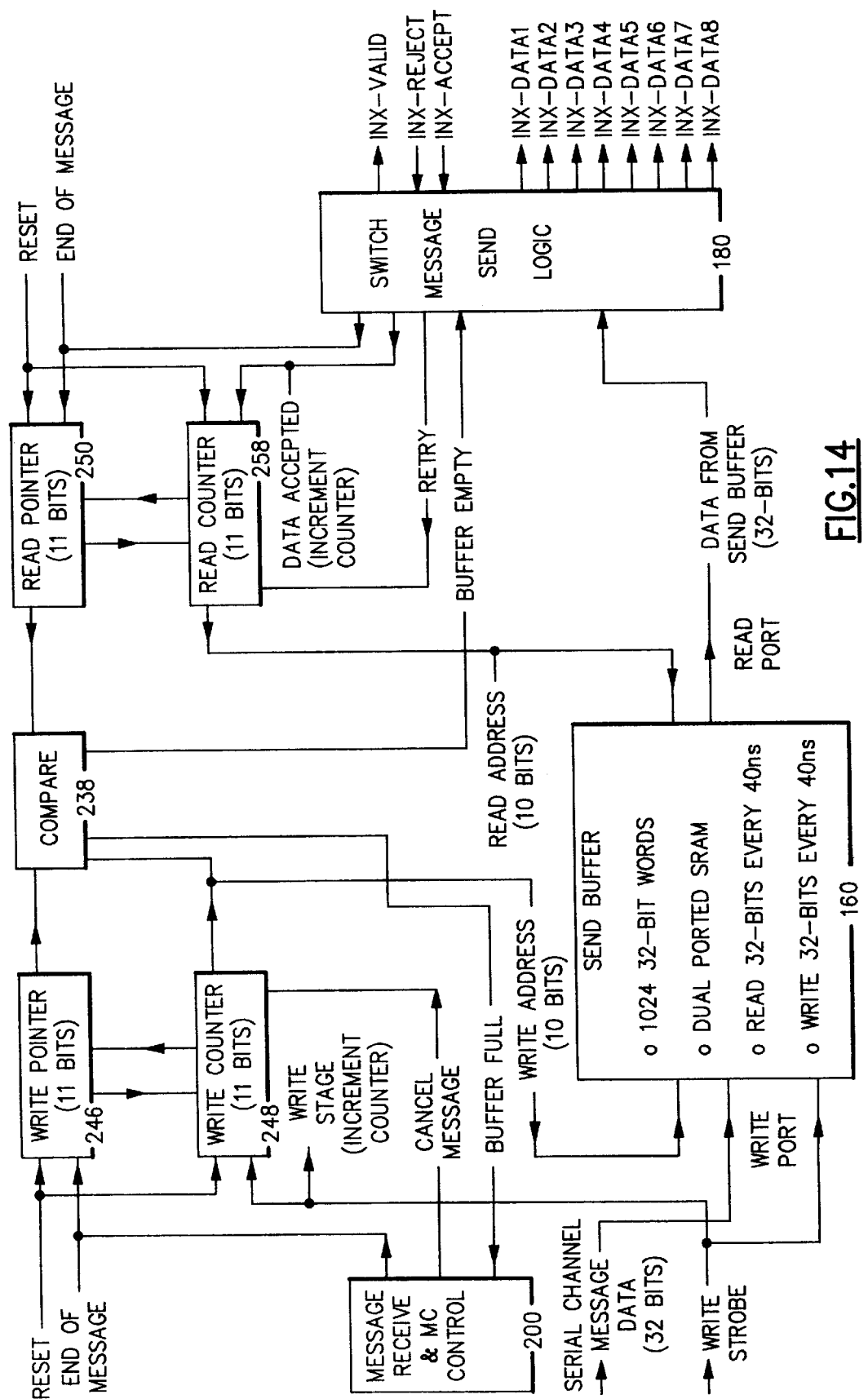
FIG. 14 shows a schematic block diagram of the send message buffer portion of the invention MicroChannel Converter or Switch Adapter function, for the purpose of buffering message data being transmitted from the MicroChannel to the multi-stage switch network.

Referring to FIG. 14, the data message as it is being received by the SA Card 6 over the MC is stored in the Switch Message Send Buffer 160 until it is received in full, then the Switch Message Send logic 180 reads the data message from buffer 160 and sends it over the parallel switch network 30. Block 200 controls the writing of Serial Channel Message Data, 32-bit words, into buffer 160 as commanded by the WRITE STROBE signal. The Send Buffer 160, for the preferred embodiment, contains 1024 32-bit words and is dual ported, so that one 32-bit word write and one 32-bit word read can occur simultaneously at a 25 MHZ rate (every 40 ns), which provides the capability of supporting up to a 1 gigabyte/sec serial data rate. The write function to Send Buffer 160 is controlled by two 11-bit entities: a write pointer 246 and a write counter 248. A Reset signal shall reset both of these 11-bit values to all zeroes. As block 200 writes each word into the write port of the buffer, the write counter 248 is used to address the write port of buffer 160 through gates 242 and 240. When each 32-bit write is complete, the write counter increments with the fall of the WRITE STROBE signal from block 200 in preparation for the next write operation. Block 200, after storing a complete valid message to buffer 150, sends the END OF MESSAGE signal, which sets the write pointer 246 equal to the write counter 248 to indicate that the valid message has been successfully stored to buffer 160. Block 200 can cancel a message or partial message from buffer 160 by issuing the CANCEL MESSAGE signal, which rolls back the value of write counter 248 by setting write counter 248 equal to the write pointer 246, pointing it back to the beginning of where the valid message was written or partially written, so that it can be rewritten correctly at a later time. When the ten low-order bits of write pointer 246 are equal to the ten low-order bits of write counter 248, as detected by comparator 238, but the high-order bit is different, buffer 160 is completely full and the BUFFER FULL signal is sent to block 200. As long as the BUFFER FULL condition exists, block 200 is prevented from doing further writes to the buffer.

The Switch Message Send logic 180 reads 32-bit words from buffer 160 and sends them to network 30. The read function is controlled by two 11-bit entities: read pointer 250 and read counter 258. A Reset signal shall reset both of these 11-bit values to all zeroes. As block 180 reads each word from the buffer, the read counter 258 is used to address the read port of buffer 160 directly. When each 32-bit read is complete, the read counter increments with the fall of the DATA ACCEPTED signal from block 180 in preparation for the next read operation. Block 180, after reading and successfully transmitting a complete valid message over network 30 from buffer 160, sends the END OF MESSAGE signal, which sets the read pointer 250 equal to the read counter 258 to indicate that the valid message has been successfully transmitted. This action effectively removes the transmitted message from the buffer and steps to the beginning of the next message to be transmitted. This clears space in buffer 160 to be used again by a future valid message. Block 180 can retry the transmission of a message or partial message to network 30 from buffer 160 by issuing the RETRY signal, which rolls back the value of read counter 258 by setting read counter 258 equal to the read pointer 250, pointing it back to the beginning of the valid message so that it can be reread. When the eleven bits of write pointer 246 are equal to the eleven bits of read pointer 250, as detected by comparator 238, buffer 160 is empty and the BUFFER EMPTY signal is sent to block 180. As long as the BUFFER EMPTY condition exists, block 180 is informed that there are no valid messages waiting to be sent to network 30. When block 200 stores a complete valid message to an empty buffer 160 and advances write pointer 246 by issuing the END OF MESSAGE signal, the write pointer 246 no longer equals the read pointer 250, which is detected by comparator 238 and deactivates the BUFFER EMPTY signal to block 180, informing it that there is now a valid message to be sent to network 30.

Figure 15:
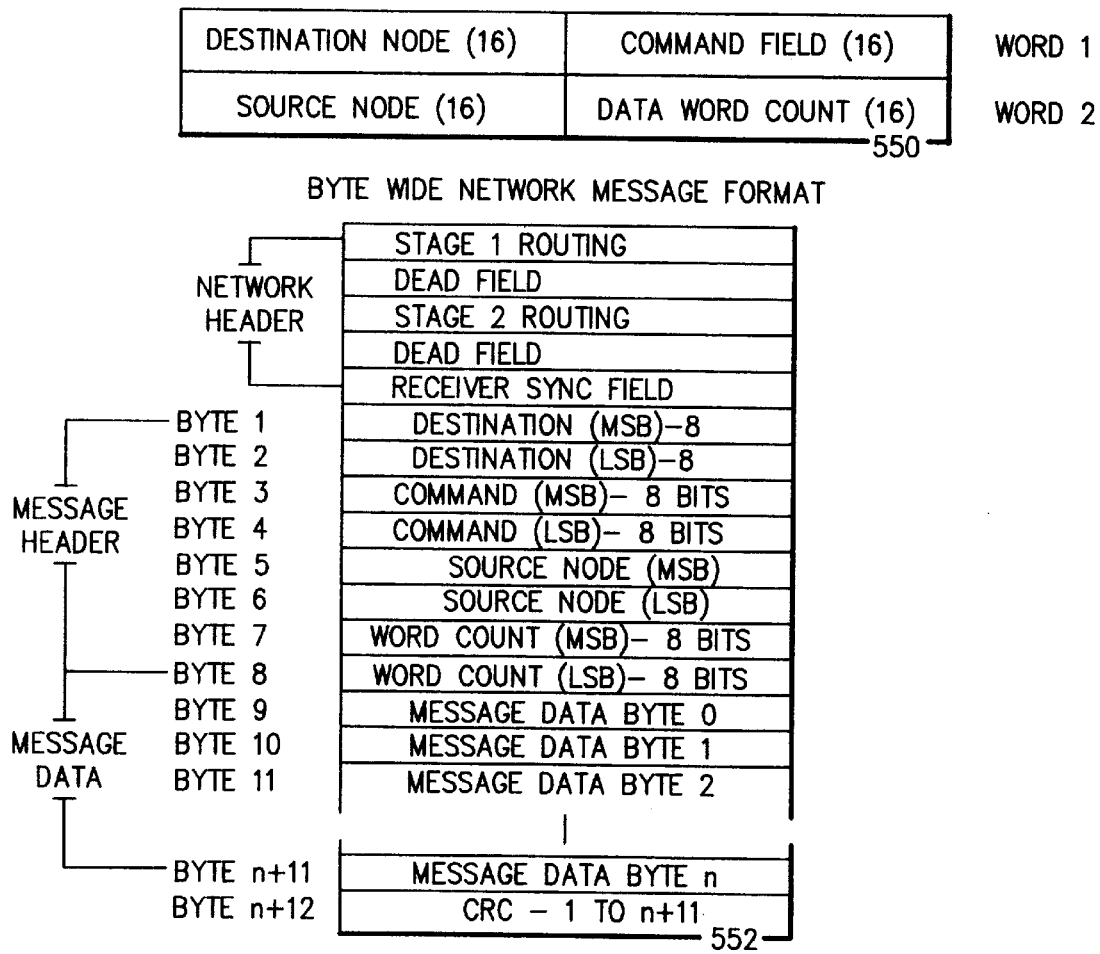
FIG. 15 shows the message header and data formats of both the MicroChannel interface protocol and the multi-stage switch network interface protocol.

The function of block 140 of FIG. 12 is to write a valid message to buffer 160 that is converted to the message format required by network 30. FIG. 15 shows the message format required by the preferred embodiment of network 30. The network 30 requires that a valid message have a two 32-bit word Message Header, as shown by block 550. Word 1 of the Message Header contains the destination node number (DID value) and defines which node is to receive the valid message, and the command field defining the type of message and other message control parameters, as shown in detail by block 554. Word 2 of the message header contains the source node number (SID value) that is generating the valid message and word count of the actual message data (excluding the two message header words). Block 180 reads the valid message from buffer 160 and sends a message over network 30 that is 4-bits wide as described above, or can have improved bandwidth through switch network 30 by going to a byte wide network transfer. The discussion from this point assumes that 4 additional data lines are added to each individual Allnode switch 10 port, increasing the number of data lines for every input and output port from 4 to 8 lines and doubling the bandwidth. The byte wide content of messages sent through the improved network 30 is shown by block 552. Block 180 uses the destination field to locate the receiving the node and to determine a path through network 30 to the destination node. Block 180 makes up the Network Header from the destination field and prefixes the message with the Network Header as shown by block 552 to be used by network 30 to route the valid message to the proper destination and to synchronize the receiving node when the data arrives. Network 30 strips the Network Header from the valid message as it makes its way through the network, stage by stage, and the receiving node strips the RECEIVER SYNC FIELD after it gets in synchronization with the incoming message. Therefore, the actual valid message that gets moved from the source node to the destination node over network 30 is the Message Header and Message Data portion of the message format shown in block 552. The Message Header portion of block 552 is the exact same two word header shown by block 550, just broken into individual bytes for transmission over the byte-wide network 30. The Message Data portion of block 552 are the data words which are stored sequentially to buffer 160 by block 140; however they are broken into individual bytes for transmission over network 30. The last portion of block 552 is a CRC field which is sent last and used to check the accuracy of the valid message.

Figure 16:
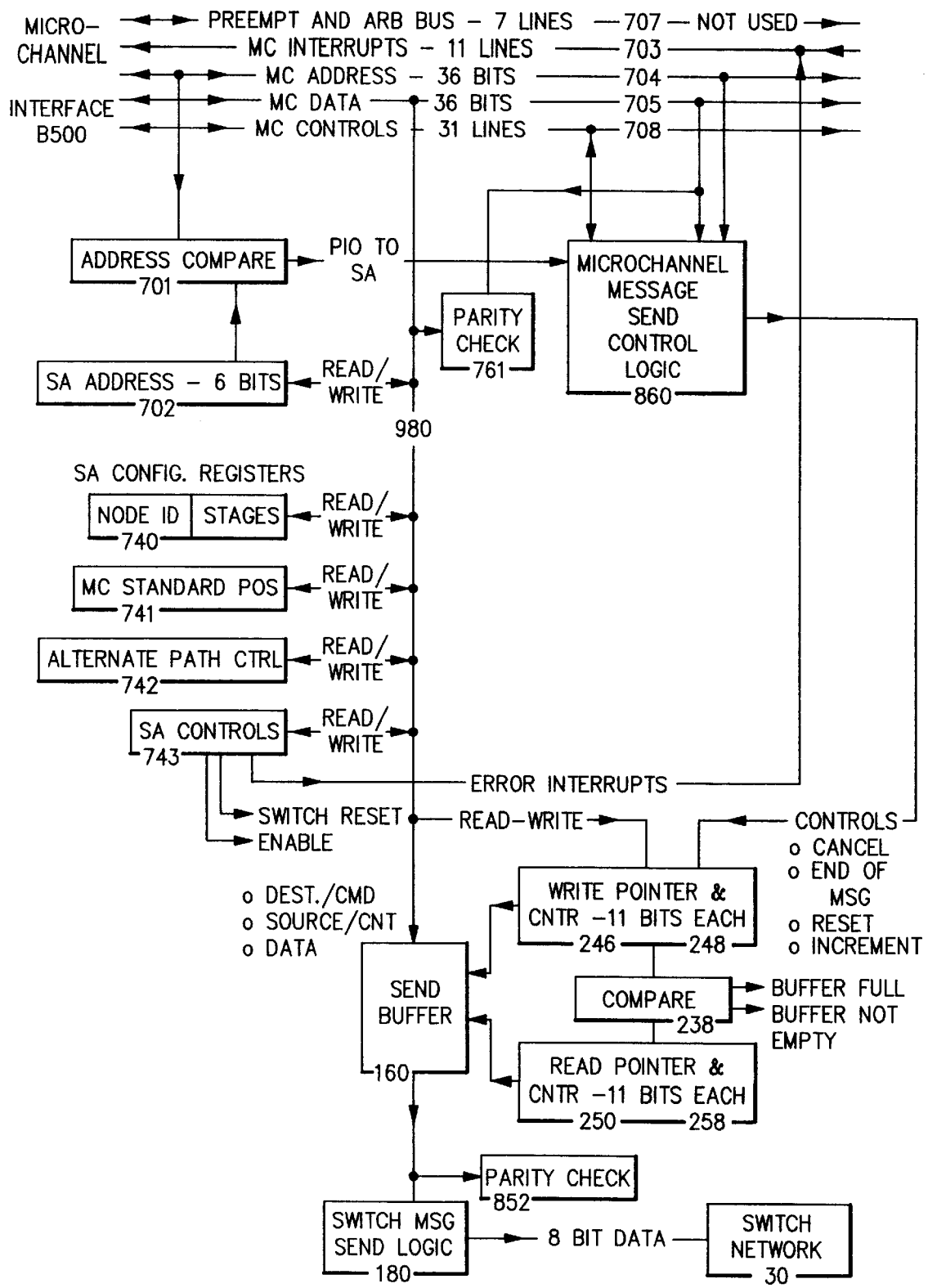
FIG. 16 shows a schematic block diagram of the MicroChannel interface portion of the invention MicroChannel Converter or Switch Adapter function, for the purpose of sending message data being transmitted from the MicroChannel to the multi-stage switch network.
Figure 17:
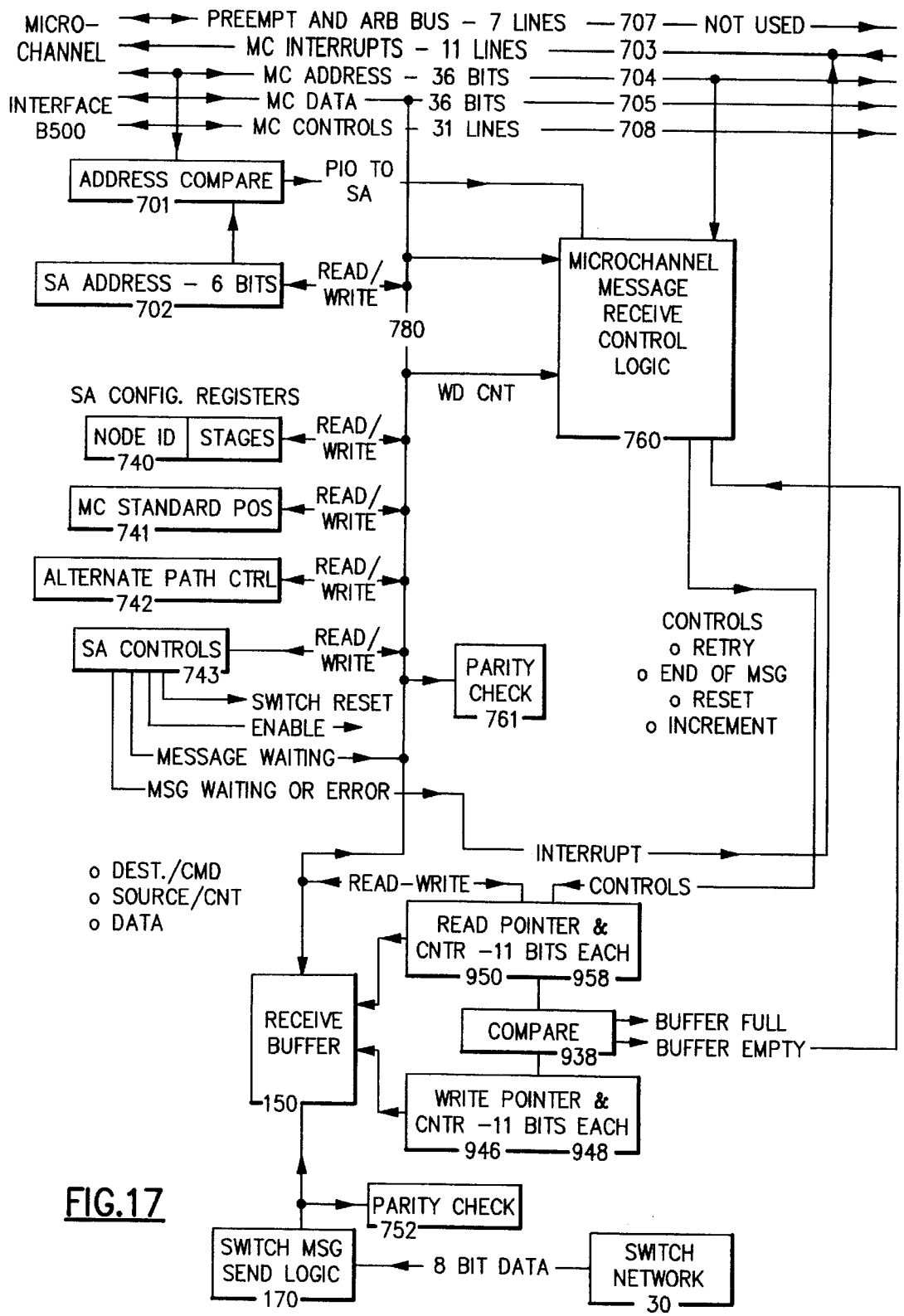
FIG. 17 shows a schematic block diagram of the MicroChannel interface portion of the invention MicroChannel Converter or Switch Adapter function, for the purpose of receiving message data being transmitted from the the multi-stage switch network to the MicroChannel.

Turning now to the MicroChannel interface and its operation with respect to sending and receiving messages from/to the SA adapter or card as controlled by blocks 140 and 130, respectively, of FIG. 12. The Slave interface requires that blocks 130 and 140 be passive components on the MC; i.e., neither can initiate a transfer of data or control information over the MC. Blocks 140 and 130 can only monitor data or control transfers initiated over the MC by processor P300 or a bus master located in one of the expansion card slots within its own MicroChannel Island. As slaves, blocks 140 and 130 must monitor all transfers initiated on the MC and determine if the transfers are addressed (destined) to them. Referring to FIGS. 16 and 17, the way blocks 140 and 130 determine if a MicroChannel transfer is destined to them is to continually monitor the MC Address bus portion of the MC Bus B500 using address compare circuitry 701 to compare every MC address 704 to a prestored MCC Address range stored in POS register 702. If the two compare, the MC transfer is determined to be destined for the SA adapter or card. By monitoring the MC −S0 and −S1, which are transmitted on the MC Control lines portion of the MC Bus B500, blocks 140 and 130 can determine if the MC transfer is a read or a write operation. Block 140 will respond to write operations over the MC which send control data or data messages from the processor P300 or a bus master to the SA adapter or card. Block 130 will respond to read operations over the MC which receive control data or data messages to be sent to processor P300 or a bus master from the SA adapter or card. Register 702 is loaded by POS control sequences to the SA adapter or card executed during system initialzation; these sequences are used to assign the MC addresss range to which each SA adapter or card shall respond.

Referring to FIG. 16, a functional diagram of the preferred embodiment of block 140 is shown. The major function of block 140 is to receive data messages from the MC into buffer 160, from where the message are transmitted to switch network 30. Block 140 has a secondary function which permits the processor P300 or a bus master to write control registers or POS registers located internally on the SA adapter or card. Many of the control registers are written by the MC POS control sequences to the SA adapter or card, which are executed during system initialzation; these sequences are used to initialize the SA network functions, such as loading register 740 to define the Destination Node Identification (ID) of each particular SA adapter or card in regards to network 30 and to define how many stages exist in network 30. Also, register 742 is loaded to define how many and which alternate paths in the network 30 are to be used. In addition, the standard MC POS registers 741 are loaded, where applicable, defining which MC interrupts to use and other standard initialization parameters. Register 702 is loaded as a POS register which assigns the MC address range to which each SA adapter or card shall respond. Block 140 can also receive non-POS control data at anytime from processor P300 or a bus master to write control register 743 for the purpose of controlling the resetting of the switch functions, the enabling of the SA send and/or receive functions, and other similar control functions. Non-POS operations can also read and write the buffer 160 and 150 pointers and counters.

The block 140 function of receiving data messages from the MC and sending them to buffer 160 is accomplished by MicroChannel Message Send Control Logic block 860. When block 701 detects that an MC Address is destined for the SA adapter or card address range, it alerts block 860 by issuing the "PIO to SA" signal. Block 860 then checks the −S0 and −S1 to determine if this MC transfer is a write operation, requiring it to respond. If it is a write operation, block 860 proceeds; if not, block 860 remains idle. For a write operation, block 860 then checks the low order address bits of the MC Address bus to determine if the MC write transfer is one for transmitting control data to the SA adapter or card, or if it is a data message transfer to network 30. The definition of the 32-bit MC address bits is shown in block 970 below.

TABLE 1

PIO COMMAND FIELD (bits 7, 6, 5, 4) DEFINITION

| | |
|---|---|
| 0000 | NO-OP |
| 0001 | NO-OP |
| 0010 | NO-OP |
| 0011 | NO-OP |
| 0100 | NO-OP |
| 0101 | READ/WRITE SA CONTROL REGISTERS |
| 0110 | NO-OP |
| 0111 | READ/WRITE SA CONFIGURATION REGISTERS (Node ID/Stages, Alternate Path Control) |
| 1000 | NO-OP |
| 1001 | NO-OP |
| 1010 | NO-OP |
| 1011 | NO-OP |
| 1100 | NO-OP |
| 1101 | NO-OP |
| 1110 | READ/WRITE SA BUFFER POINTERS & COUNTERS |
| 1111 | READ/WRITE DATA MESSAGE |

Bits 3 and 2 of SA Address word 970 further modify the command type, for instance, by indicating a particular SA Configuration register which is to be written if the command is 0111. Bits 1 and 0 of SA Address word 970 are the byte alignment bits and must always be 00 to indicate that all transfers to/from the SA adapter and card are 32-bit word aligned.

Block 860 responds to SA write commands over the MC by receiving them and then executing them as quickly as possible. The primary function of block 140 is to receive data messages from processor P300 or a bus master on the MC and to place the data message as received into the Send Buffer 160. This is accomplished 32-bits at a time causing the data message to be accumulated in buffer 160 for transmission to switch network 30 after the complete data message has been received.

Block 860 controls the moving of the data message from the MC DATA bus 705 to buffer 160. When block 860 detects that MC Address bits 7 to 4 contain the 1111 command (see Table 1) for a write command issued to the SA adapter or card, block 860 becomes active and starts a data message transfer from the MC to buffer 160. Block 860 connects MC DATA bus 705 to the SA internal data bus 980 which transports the MC data to buffer 160. Block 860 issues timing control signals to buffer 160 and write counter 248 to move each 32-bit data word individually from the MC DATA bus 705 to buffer 160, and to increment the write address counter after each word is stored to buffer 160. Block 860 detects when the second word of the data message (Header Word 2 as define in FIG. 15) is on the MC DATA bus 705, and in addition to sending this word to buffer 160 as it does with all data words, block 860 receives and stores part of Header Word 2 to an internal register. The portion

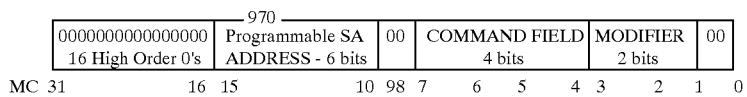

Bits 15 to 10 of the MC Address are compared against register 702 by comparator 701. Bits 7 to 4 determine the particular command (type of MC transfer) being performed; block 860 includes a command register which stores bits 7 to 4 and defines the particular command which is presently active. The commands that block 860 is capable of executing (based on MC bits 7 to 4 of the address word 970) are defined in detail in TABLE 1.

received is bits 15 to 0 which define the data word count of the present data message. As block 860 stores each word to buffer 160, it decrements the word count until it goes to zero to indicate the entire message has been received. When the count goes to zero, block 860 issues the "End of Msg" signal to Write Pointer 246 to indicate that a complete message has been stored to buffer 160. The "End of Msg" signal causes write pointer 246 to assume the value to which write counter 248 has been incremented; this causes the compare 238 logic to change the "Buffer Empty" to the not-empty state, if it was not in that state previously. The "Buffer Empty" signal being in the not-empty state, informs block 180 that there is a message in buffer 160 ready to be sent to network 30, and block 180 becomes active and sends the message.

As the data message is being received from the MC, block 761 continually checks both the address and data parity being transmitted over the MC bus B500. If a parity error is detected, the message is aborted by block 860, which issues the "Cancel" control signal to the send buffer counters. "Cancel" causes the send buffer counter 248 to reset and erase any portion of the message that was stored to buffer 160. Block 860 records the error in register 743 and issues the "–Channel Check" signal to the MC, which is part of the MC Control Signals 708, to indicate the error and terminate the MC transfer. Block 860 after detecting an error can issue an interrupt to the MC, if enabled by Control register 743.

Referring to FIG. 17, a functional diagram of the preferred embodiment of block 130 is shown. The major function of block 130 is to receive data messages from switch network 30 which have been sucessfully stored into buffer 150, and to transfer the messages from buffer 150 to the MC. Block 130 has a secondary function which permits the processor P300 or a bus master to read control registers or POS registers located internally on the SA adapter or card. Many of the control registers are read by the MC POS control sequences issued to the SA adapter or card, which are executed during system initialzation; these sequences are used to read the card identification number and the standard manufacturing parameters associated with the SA expansion card. Any of the SA adapter or card registers, pointers, counters, etc. can be read for diagnostic purposes by non-POS read operations.

The block 130 function of receiving data messages from buffer 150 and sending them to MC is accomplished by MicroChannel Message Receive Control Logic block 760. When block 701 detects that an MC Address is destined for the SA adapter or card address range, it alerts block 760 by issuing the "PIO to SA" signal. Block 760 then checks the –S0 and –S1 to determine if this MC transfer is a read operation, requiring it to respond. If it is a read operation, block 760 proceeds; if not, block 760 remains idle. For a read operation, block 760 then checks the low order address bits of the MC Address bus to determine if the MC read transfer is one for transmitting control data from the SA adapter or card, or if it is a data message transfer to the MC.

Bits 15 to 10 of the MC Address 970 are compared against register 702 by comparator 701. Bits 7 to 4 of MC Address 970 determine the particular command (type of MC transfer) being performed; block 760 can be active at the same time as block 860 and includes a different command register which stores bits 7 to 4 and defines the particular read command which is presently active. The read commands that block 760 is capable of executing (based on MC bits 7 to 4 of the address word 970) are defined in detail in TABLE 1.

Bits 3 and 2 of SA Address word 970 further modify the command type, for instance, by indicating a particular SA Configuration register which is to be read if the command is 0111. Bits 1 and 0 of SA Address word 970 are the byte alignment bits and must always be 00 to indicate that all transfers to/from the SA adapter and card are 32-bit word aligned.

Block 760 knows if there is a complete message waiting in buffer 150 for transfer to the MC when the "Buffer Empty" signal from block 938 is in the not-empty state.

However, Block 760, being an MC Slave, must obey the MC slave rules. This means that when block 760 determines that there is a complete message waiting in buffer 150 for transfer to the MC, block 760 has no capability to arbitrate for the MC and transfer the data. The PREEMPT and ARB bus signals 707 of the MC bus B500 are not used by MC slaves. Instead, as a slave, block 760 has 2 options; it must either await a poll from the MC, whereby processor P300 or a bus master can determine that there is a message waiting to be read, or issue an interrupt to processor P300 or a bus master to inform them that there is a message waiting. In either case, block 760 causes the Message Waiting bit in register 743 to become active whenever there is a message waiting in buffer 150. Block 743 will issue the Message Waiting Interrupt one time whenever the Message Waiting bit of register 743 becomes active, if the interrupt has previously been enabled by a write command to register 743. Processor P300 or a bus master eventually reads register 743 and sees the Message Waiting bit active. The read of register 743 can be accomplished by processor P300 or a bus master continually reading register 743 looking for the Message Waitng bit to become active (referred to as polling), or by receiving the Message Waiting Interrupt. After being made aware that a message is waiting, processor P300 or a bus master can read the message from the SA adapter or card by issuing a PIO read command over the MC.

Block 760 responds to SA read commands over the MC by receiving them and then executing them as quickly as possible. The primary function of block 130 is to send data messages to processor P300 or a bus master on the MC from Receive Buffer 150. Block 760 controls the moving of the data message from buffer 150 to the MC DATA bus 705. When block 760 detects that MC Address bits 7 to 4 contain the 1111 command (see Table 1) for a read command issued to the SA adapter or card, block 760 becomes active and starts a data message transfer from buffer 150 to the MC. Block 760 connects MC DATA bus 705 to the SA internal data bus 780 which transports data from buffer 150 to the MC. Block 760 generates timing control signals to buffer 150 and write counter 948 to move each 32-bit data word individually from buffer 150 to the MC DATA bus 705, and to increment the read address counter after each word is read from buffer 150. Block 760 detects when the second word of the data message (Header Word 2 as define in FIG. 15) is being transferred, and in addition to sending this word to the MC as it does with all data words, block 760 receives and stores part of Header Word 2 to an internal register. The portion received is bits 15 to 0 which define the data word count of the present data message. As block 760 moves each word to the MC, it decrements the word count until it goes to zero to indicate the entire message has been transferred. When the count goes to zero, block 760 issues the "End of Msg" signal to Read Pointer 946 to indicate that a complete message has been read. The "End of Msg" signal causes read pointer 946 to assume the value to which read counter 948 has been incremented; this causes the compare 938 logic to change the "Buffer Empty" to the empty state, if no further data messages are stored in buffer 150. The "Buffer Empty" signal being in the empty state, informs block 760 that there are no further messages waitng in buffer 150, and block 760 becomes inactive after completing the transfer of the present message.

If the "Buffer Empty" signals remains in the not-empty state, this indicates that further data messages are stored in buffer 150. The "Buffer Empty" signal being in the not-empty state will keep the Message Waiting bit active in register 743, and when read again by processor P300 or a bus master will indicate that further messages must be read.

As the data message is being transferred to the MC, block 761 continually checks both the address and data parity being transmitted over the MC bus B500. If a parity error is detected, the message is aborted by block 760, which isssues the "Retry" control signal to the receive buffer counters. "Retry" causes the read counter 948 to reset back to the beginning of the data message, so that a retry of the read operation can be tried again from the beginning of the message. Block 760 records the error in register 743 and issues the "−Channel Check" signal to the MC, which is part of the MC Control Signals 708, to indicate the error and terminate the MC transfer. Block 760 after detecting an error can issue an interrupt to the MC, if enabled by Control register 743.

The function of block 140 of FIG. 12 is to write a valid message to buffer 160; i.e., a message which is converted to the message format required by network 30, so that buffer 160 contains the proper two word Message Header, the Message Data words, and the CRC field. Block 140 does this by writing a 32-bit word to buffer 160 for every word received from the MC.

Referring to FIG. 12, once block 140 places a complete message in buffer 160, it is the function of block 180 to read the message from buffer 160 and to transmit it to the proper destination node over network 30. The timing for the Network Message Send function is shown in FIG. 18 including the establishment of the network path and the sending of the valid message over the network path. When the BUFFER EMPTY signal from block 238 (FIG. 14) is active, the Network Send Logic is IDLE and not active. When the BUFFER EMPTY signal goes to zero, the Network Send Logic 180 is activated and generates a series of timing signals called ST0 to ST9 (Sending Time 0 to 9) that control the send operation as shown in FIG. 18.

Figure 19A:
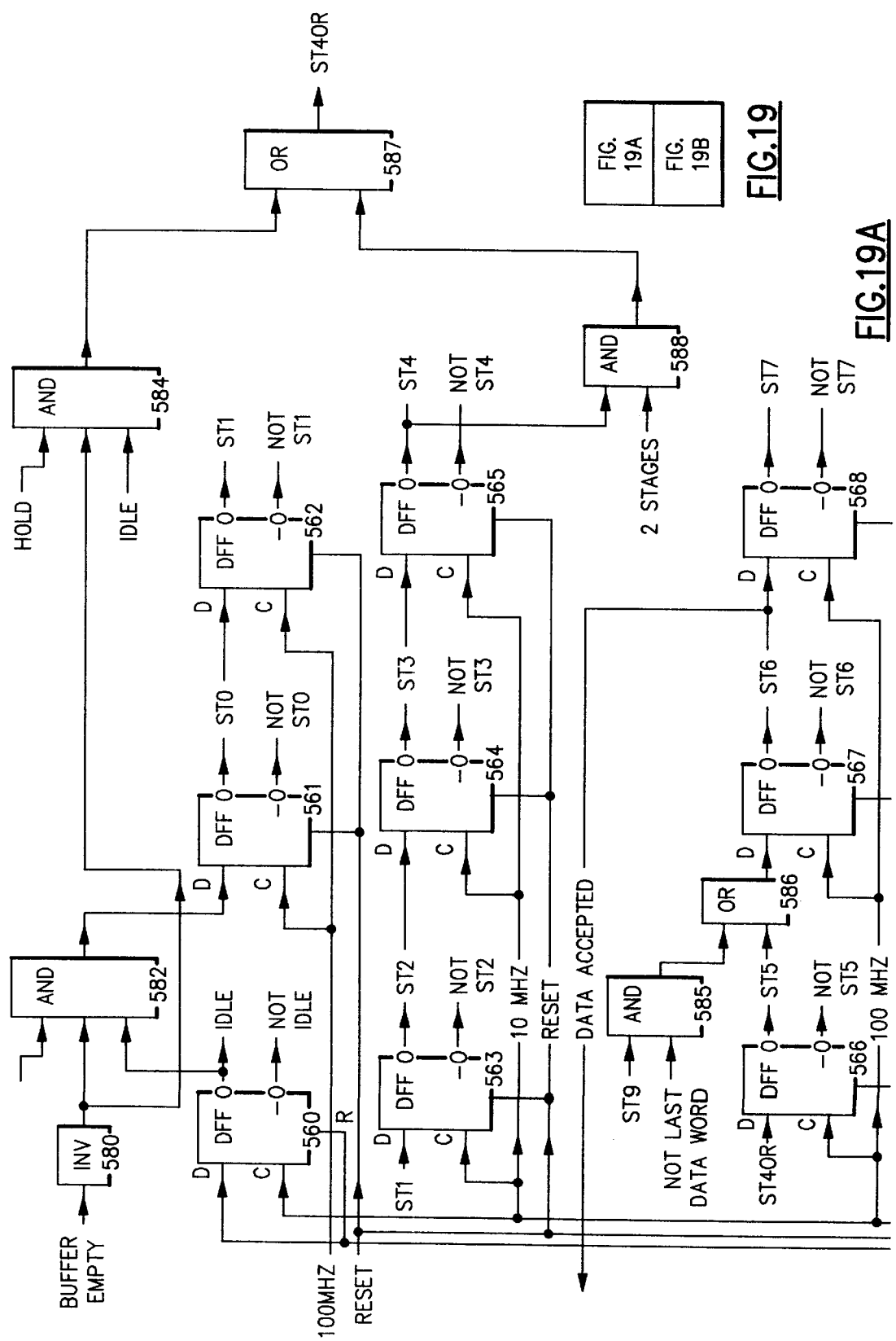
FIG. 19 shows a schematic block diagram of the timing logic associated with the switch interface sending message portion of the invention Switch Adapter function, for the purpose of sending message data being to the multi-stage switch network from the MicroChannel.
Figure 19B:
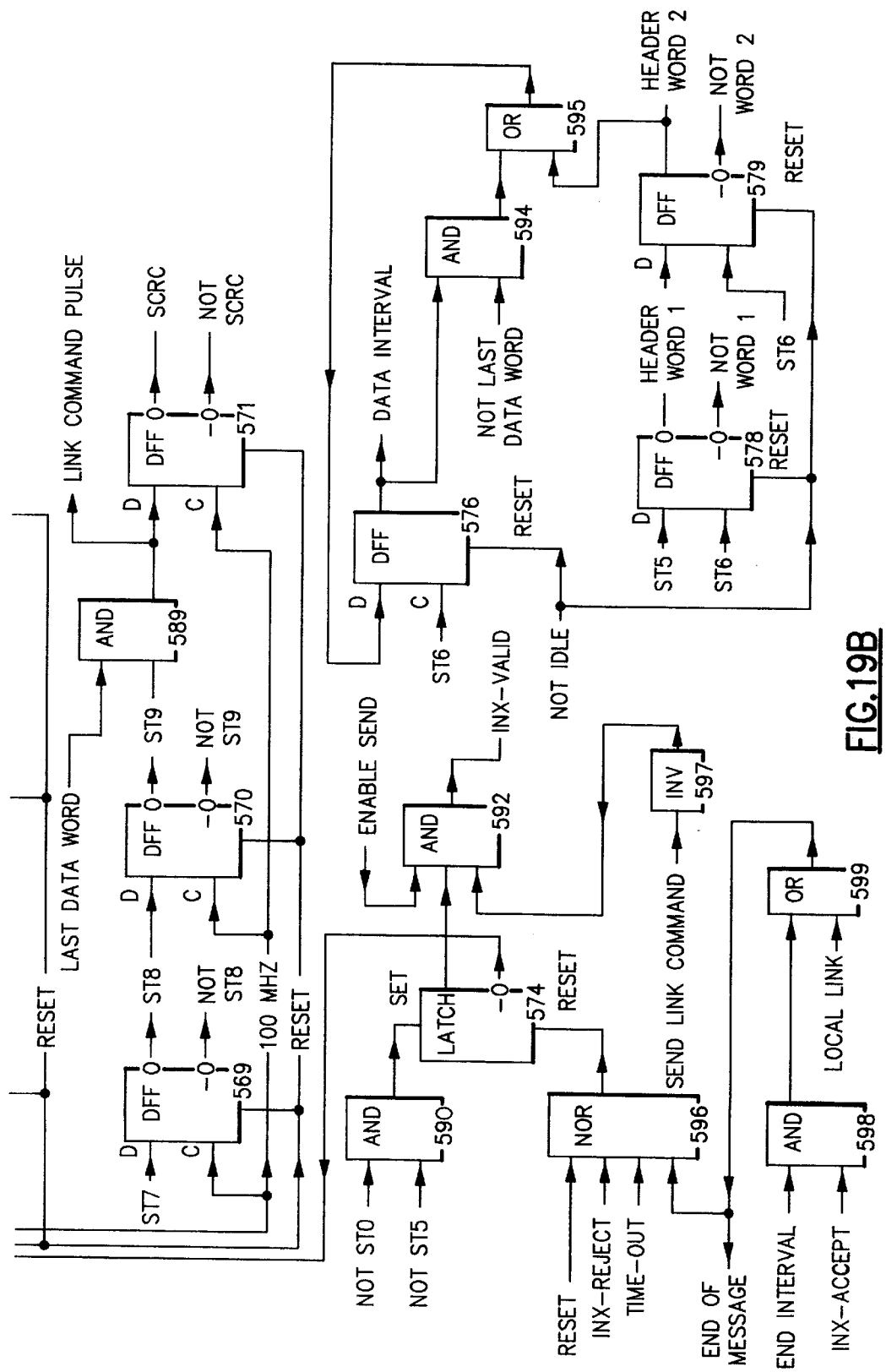

Referring to FIG. 19, the detailed timing logic of block 180 is shown. The BUFFER EMPTY arrives into block 180 from buffer 160, is inverted by gate 580, and used in conjunction with the latch 560 IDLE state to set ST0 latch 561 through gate 582. Latch 561 feeds gate 590 and causes latch 574 to set, which feeds the IDLE latch 560 and causes it to reset—taking block 180 out of the IDLE state. The ST0 to ST9 timing latches and the IDLE latch all are set and reset based on a 100 MHZ clock signal having a 10 ns period, which is the basic transmission frequency of the preferred embodiment of block 180 and causes a byte of data to be transmitted at a 100 Mbyte/sec rate. The 100 MHZ signal causes a new timing signal to be set every 10 ns and the old timing signal to be reset. For instance, the first rise of the 100 MHZ clock signal after the BUFFER EMPTY signal goes inactive, the ST0 signal is set and the IDLE signal is reset. The second rise of the 100 MHZ clock signal after the BUFFER EMPTY signal goes inactive, ST1 latch 562 which is fed from the ST0 signal is set, and the ST0 signal is reset at the same time. This continues in sequence, as shown in FIG. 19, right through time ST9. After ST9 latch 578 is set, it feds back through gates 585 and 586 and causes ST6 latch 567 to set a second time following ST9. Again ST7, 8, and 9 follow the setting of ST6 in sequence every 10 ns, and again ST6 follows ST9. This ST6 to ST9 timing loop continues until all the data words n in the message have been sent to the network 30 as shown in FIG. 18.

Figure 20B:
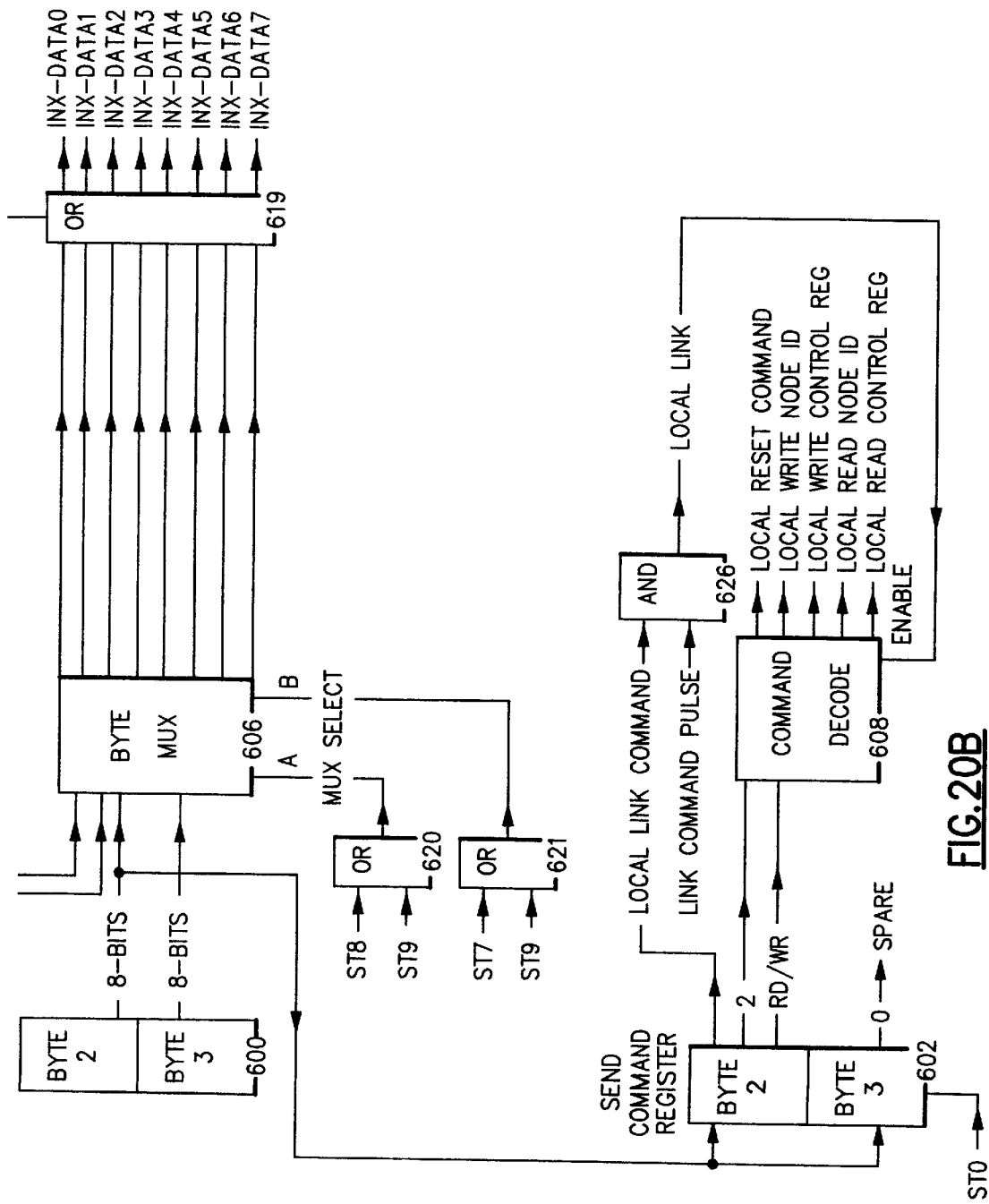
FIG. 20 shows a schematic block diagram of the data conversion logic associated with the switch interface sending message portion of the invention Switch Adapter function, for the purpose of sending message data being to the multi-stage switch network from the MicroChannel.

Referring to FIG. 20, the detailed logic of block 180 which takes 32-bit words from buffer 160 and converts them into the byte wide network message protocol is shown. A 32-bit word is read from buffer 160 into the four byte register 600 every 100 ns. The first word is read in at ST0 time, clocking register 600 through gate 610 at ST0 time. The first word is Header Word 1, which contains the destination node ID in bytes 0 and 1 and the command field in bytes 3 and 4, as shown in FIG. 17. The 3-bit selector function 604 is a multiplexer function which looks at the destination node field (bytes 0 and 1) of register 600 and selects 2 bits at a time to contruct the network header portion of the network message as shown by block 552. The preferred network 30 embodiment has two network stages as shown by FIG. 7, and requires two stage routing bytes to establish a path through network 30—a stage 1 routing byte which is constructed at time ST1 and a stage 2 routing byte that is constructed at ST3 time, as shown in FIG. 18. 2-bit selector 604 and 2-to−4 decoder 605 combine to construct the stage 1 and 2 routing bytes from the destination node bytes stored in register 600. During time ST1, selector 604 selects the low order 2 bits of byte 1 of register 600 to be gated through to decoder 605 which converts the 2-bits to an 4 bit code that becomes the stage 1 routing byte, which is transmitted to network 30 through gates 618 and 619 over the INX-DATA lines. During time ST3, selector 604 selects the next high order 2 bits of byte 1 of register 600 to be gated through to decoder 605 which converts the 2-bits to an 4 bit code that becomes the stage 2 routing byte, which is transmitted to network 30 through gates 618 and 619 over the INX-DATA lines. For larger networks, the process would continue to generate further stage routing bytes based on the higher order bits of the destination node field in bytes 0 and 1 of register 600; however, for the two stage preferred embodiment, just the two routing bytes are required and the higher order destination node bits are not used. Gate 617 is used to enable blocks 604 and 605 only at ST1 or ST3 times, so that for all other times decoder 605 passes all zeroes to gate 618; this causes the all zeroes dead fields to be generated during times ST2 and ST4 times, as shown in FIG. 18. At ST5 time, gate 618 ORs an all ones data byte to network 30 through gate 619 over the INX-DATA lines, which provides the receiver sync field portion of the network message. Previous to sending the network header to network 30, the INX-VALID signal to network 30 is activated by gate 592 (FIG. 19) to inform network 3 that a valid message is being transmitted.

Figure 21:
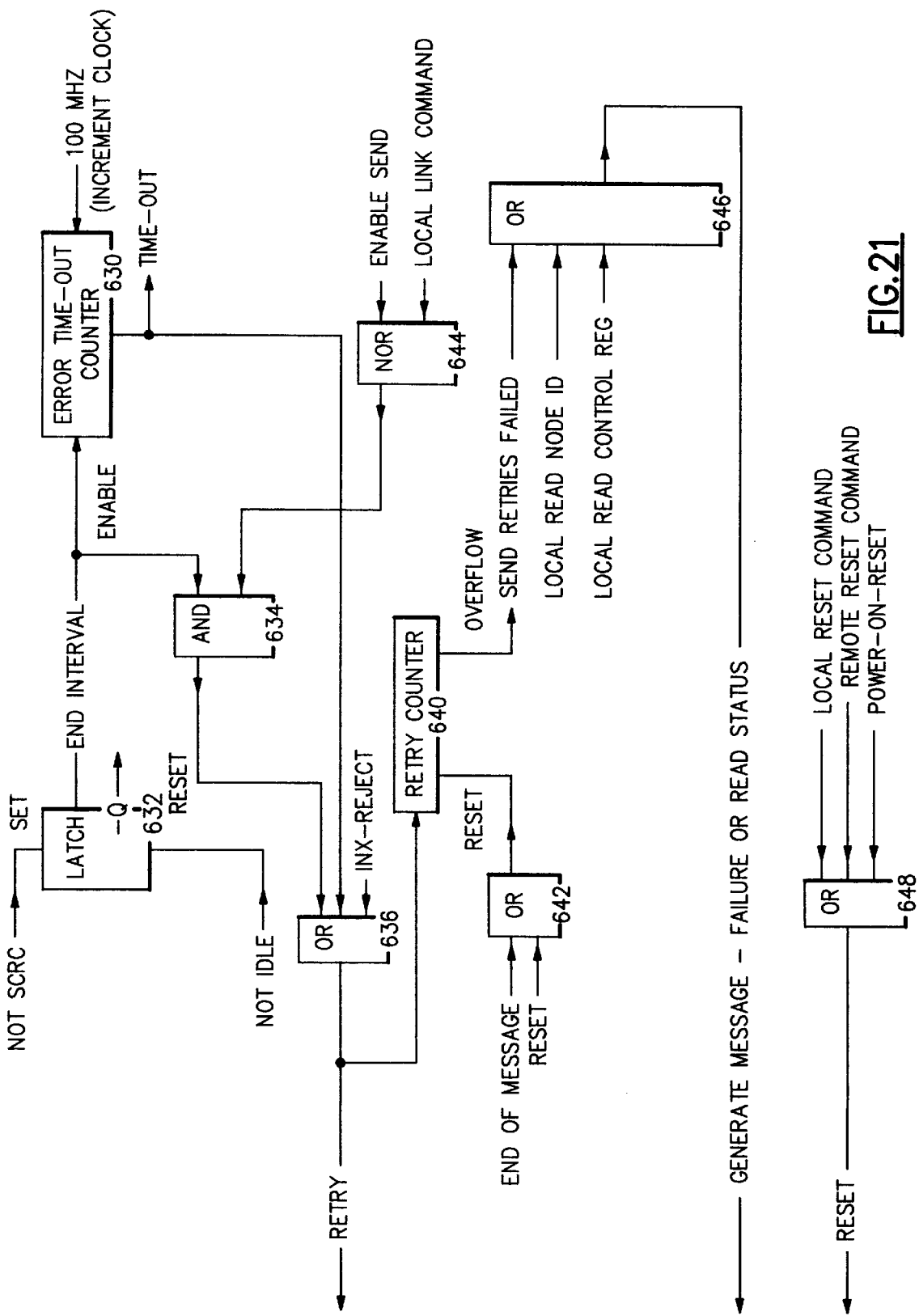
FIG. 21 shows a schematic block diagram of the control logic associated with the switch interface sending message portion of the invention Switch Adapter function, for the purpose of sending message data being to the multi-stage switch network from the MicroChannel.

For messages that are sent to network 30 by block 180, the message header and message data portion of the message shown in block 552 of FIG. 17 is constructed starting at time ST6, and one 32-bit word is transmitted to network 3 as 4 consecutive bytes sent every ST6 to ST9 time period. Byte MUX 604 constructs this portion of the message by selecting byte 0 from register 600 at time ST6, byte 1 at time ST7, byte 2 at time ST8, and byte 3 at time ST9 as controlled by gates 620 and 621. At every ST6 time through gate 610, register 600 is loaded with a new 32-bit word from buffer 160 to be sent to network 30. The DATA ACCEPTED signal is generated by latch 567 in FIG. 19 and is the same as the ST0 signal. The DATA ACCEPTED signal causes the read counter associated with buffer 160 to increment the read address to buffer 160 every ST6 time, which causes new data to be loaded into register 600 at the following ST6 time as shown in the timing diagram of FIG. 18. The control logic of FIG. 19 marks the sending of Header Word 1 by setting latch 578 during the first ST6 to 9 time period, and the sending of Header Word 2 by setting latch 579 during the second ST6 to 9 time period. After the two message header words are transmitted, the message data words are transmitted during the DATA INTERVAL specified by latch 576 which is set through gate 595 and held set through gates 594 and 595 until the LAST DATA WORD is detected. During Header Word 1 time 578, the Destination Node ID is transmitted in the first two bytes and the command field in the second two bytes as shown in FIG. 17. During Header Word 2 time 579, the Source Node ID is transmitted in the first two bytes and the word count field in the second two bytes as shown in FIG. 17. At the same ST6 time that Header Word 2 is loaded into register 600 (the second ST6 time), count register 601 of FIG. 20 is loaded through gate 615 and delay 616 with the word count value for the present message, and defines how many data words are provided with the present message. Delay block 616 causes count register 601 to be loaded after the first 610 decrement signals has been issued, so that count register 601 is not decremented for Header Words 1 or 2. However, as every data word is loaded into register 600 at ST6 time, count register 601 is decremented by 1 at subsequent ST6 times, as shown in FIG. 18. Count Equals Zero Detect block 607 detects when count register 601 has decremented to zero as an indication that the last data word of the message has been loaded into register 600. Count register 601 going to zero and being detected by block 607 causes the LAST DATA WORD signal and its inverse to be generated by gates 612 and 614. Referring to FIG. 19, the Last DATA WORD signal into gate 585 prevents ST6 from occuring again after the last byte of the last data word is transmitted at ST9 time, instead gate 589 causes the SEND CRC latch 571 to set (SCRC) after the last ST9 signal transmits the last data byte. The SCRC signal 571 goes to gate 610 (FIG. 20) and cause the CRC byte from buffer 160 to be loaded into register 600, from which it is sent through MUX 606 and gate 619 to network 3 over the INX-DATA lines, as shown by FIG. 18. This completes the sending of the valid message to network 30, and the setting of SCRC latch 571 causes END INTERVAL latch 632 (FIG. 21) to become active. The INX-VALID signal 592 is left active during END INTERVAL 632 giving the receiving node an opportunity to resond to the valid message with either an INX-ACCEPT or INX-REJECT signal. FIG. 18 shows the timing for the receiving node accepting the message and responding with the INX-ACCEPT signal.

Referring to FIG. 19, the INX-ACCEPT signal occurring during the END INTERVAL 632 time period causes gates 598 and 599 to go active and the END OF MESSAGE signal 599 to go active, which goes to buffer 160 and causes the valid message just sent and accepted to be erased from the buffer 160 and latch 574 to be reset through gate 596. The resetting of latch 574 causes the INX-VALID signal to go inactive which breaks the connection established through network 30, and returns the network port to the idle condition, which is caused by latch 574 setting the IDLE latch 560. If the BUFFER EMPTY signal is still active or becomes active again, indicating that buffer 160 has another valid message to be sent, the network send message operation will start over again from the beginning and process the next valid message.

Blocks 170 and 150 of FIG. 12 functions similarly to blocks 180 and 160, respectively, except the data flow is in the opposite direction with data messages arriving from network 30. The network 30 messages arriving into block 170 are in the format shown by the message header and message data portion of block 552 of FIG. 17. Block 170 checks the message data arriving from network 30 for correctness using the CRC check byte. Block 170 also converts the message data to 32-bit words, which its stores into block 150. Block 150 alerts block 130 of FIG. 12 that a message has arrived. Block 130 alerts processor P300 by interrupt that a message is waiting or waits for processor P300 to poll using a specially coded PIO instruction. In either case, processor 30 responds to a poll or interrupt by reading reading buffer 150 through MicroChannel Receive Logic 130 using a PIO instruction addressed to block 130.

Note with respect to FIG. 6, that it is possible to increase the number of data lines at all input and output ports. For instance, adding data lines 5 to 8 would provide a byte wide interface at all ports and double the data transmission rate through network 30.

Note with respect to the drawings, such as those of FIG. 13 the block areas are not intended to indicate the actual physical space occupied on the chip by the functions.

Clearly, the inventions which we have described by way of example and in illustration of our best mode of practicing the inventions in the various embodiments described provide a basis for much potential growth. Accordingly, it will be understood that those skilled in the art, both now and in the future, will envision further improvements even by way of invention, and these should be understood to be within the claimed scope which should be construed to protect and preserve the rights of the inventors.

What is claimed is:

1. An adapter not requiring a local processor or software, comprising:

transmission means for transmitting and for converting an unpacketized data message sent between a multistage switch network operating under a switch protocol and a node operating under a bus protocol that is different from the switch protocol, the switch protocol including a parallel data transmission format wherein a plurality of bits of the data message are transmitted in parallel, said node including:
    a processor coupled to a bus, the bus including a plurality of bus lines; and
    means for receiving and sending said data message over the bus;

said transmission means comprising:
    a receive buffer for storing a complete data message sent from the multi-stage switch network;
    a send buffer for storing a complete data message sent from the node;
    a clockless switch interface for coupling the adapter to the multi-stage switch network;
    a bus interface for coupling the adapter to the bus; and
said adapter comprising a retry means where the adapter automatically without processor intervention continues to resend a message until a positive indication is received back over the network that the message has been received without error.

2. The adapter of claim 1, wherein the bus interface comprises:
    means for converting a data message sent from the node from said bus protocol to said switch protocol including means for changing a bandwidth of the data message sent from the node, for removing parity bits from the data message sent from the node, and for adding to the data message sent from the node:
    switch network routing headers having dead fields, a receiver synchronization field, and cyclic redundancy checks.

3. The adapter of claim 2, wherein the switch network comprises:
    a plurality of bufferless switching apparatuses cascaded into a plurality of stages, said switching apparatuses each including:
        a plurality of switch inputs and a plurality of switch outputs, of the switch outputs included on each of said switching apparatuses each coupled to a different one of the switching apparatuses via a switch input of said different one of the switching apparatuses, switch outputs of last stage switching apparatuses each comprising a network output port and switch inputs of first stage switching apparatuses each comprising a network input port;

connection means for establishing a communication path between any one of the network input ports and any one of the network output ports in response to said switch network routing headers received at said any one of the network input ports, said communication path for transmitting a data message received at said any one of the network input ports to said any one of the network output ports; and said connection means including asynchronous connection means for establishing asynchronously a plurality of simultaneously active communication paths between a plurality of network input ports and a plurality of network output ports in response to a plurality of switch network routing headers received separately or simultaneously at said plurality of network input ports, said simultaneously active communication paths for transmitting concurrently a plurality of data messages received separately or simultaneously at said plurality of network input ports to said plurality of network output ports;

said input ports, said output ports, and said communication paths each comprising a plurality of parallel data lines for transmitting a data message in the parallel format; and said switch interface including means for coupling to one of the network input ports and to one of the network output ports.

4. The adapter of claim 3, wherein the bus interface further comprises:
   means for identifying control data received over a second subset of the bus lines;
   means for identifying data message data received over a third subset of the bus lines;
   means for processing the control data; and
   means for sending the data message data to the send buffer.

5. The adapter of claim 4, wherein the bus interface further comprises:
   means for sending to the bus a signal indicating that the receive buffer has stored the data message from the switch network;
   means for identifying a read transfer command sent over the bus by the processor; and
   means for sending over the bus the data message stored in the receive buffer in response to the read transfer command.

6. The adapter of claim 5, wherein the switch interface comprises:
   means for receiving the complete data message sent from the node and stored in the send buffer;
   means for assembling the data message stored in the send buffer into the switch protocol, the switch protocol including a plurality of bits sent in parallel;
   means for sending the data message in the switch protocol to the switch network; and
   means for receiving a reject signal from the switch network sent by a receiving node, the reject signal indicating an erroneous data transmission detected by the receiving node.

7. The adapter of claim 1, wherein the bus interface further comprises:
   means for identifying control data received over a second subset of the bus lines;
   means for identifying data message data received over a third subset of the bus lines;
   means for processing the control data; and
   means for sending the data message data to the send buffer.

8. The adapter of claim 7, wherein the bus interface further comprises:
   means for sending to the bus a signal indicating that the receive buffer has stored the data message from the switch network;
   means for identifying a read transfer command sent over the bus by the processor; and
   means for sending over the bus the data message stored in the receive buffer in response to the read transfer command.

9. The adapter of claim 8, wherein the switch interface comprises:
   means for receiving the complete data message sent from the node and stored in the send buffer;
   means for assembling the data message stored in the send buffer into the switch protocol, the switch protocol including a plurality of bits sent in parallel;
   means for sending the data message in the switch protocol to the switch network; and
   means for receiving a reject signal from the switch network sent by a receiving node, the reject signal indicating an erroneous data transmission detected by the receiving node.

10. The adapter of claim 1, wherein the switch network comprises:
    a plurality of bufferless switching apparatuses cascaded into a plurality of stages, said switching apparatuses each including:
       a plurality of switch inputs and a plurality of switch outputs, of the switch outputs included on each of said switching apparatuses each coupled to a different one of the switching apparatuses via a switch input of said different one of the switching apparatuses, switch outputs of last stage switching apparatuses each comprising a network output port and switch inputs of first stage switching apparatuses each comprising a network input port;
       connection means for establishing a communication path between any one of the network input ports and any one of the network output ports in response to a data message header received at said any one of the network input ports, said communication path for transmitting a data message received at said any one of the network input ports to said any one of the network output ports; and
       said connection means including asynchronous connection means for establishing asynchronously a plurality of simultaneously active communication paths between a plurality of network input ports and a plurality of network output ports in response to a plurality of data message headers received separately or simultaneously at said plurality of network input ports, said simultaneously active communication paths for transmitting concurrently a plurality of data messages received separately or simultaneously at said plurality of network input ports to said plurality of network output ports;

said input ports, said output ports, and said communication paths each comprising a plurality of parallel data lines for transmitting a data message in a parallel format; and said switch interface including means for coupling to one of the network input ports and to one of the network output ports.

11. The adapter of claim 1 wherein said bus interface comprises:

means for receiving switch network configuration data to indicate destination IDs of other adapters coupled to the switch network and a size of the switch network to permit delivery of the data message to a designated destination from the switch network;

means for storing the switch network configuration data; and means for converting a data message from the node from said bus protocol to said switch protocol including means for changing a bandwidth of the data message sent from the node, for removing parity bits from the data message sent from the node, and for adding to the data message sent from the node: switch network routing headers having dead fields, a receiver synchronization field, and cycle redundancy checks.

12. The adapter of claim 1 wherein the send buffer further comprises:

a control means for writing a data message from the bus interface into the send buffer;

a write pointer and a write counter to control the writing of the data message into the send buffer from the bus interface;

a control means for reading the data message from the send buffer into the switch network interface; and a read pointer and a read counter to control the reading of the data message from the send buffer into the switch network interface.

13. The adapter of claim 1 wherein the receive buffer further comprises:

a control means for writing a data message from the switch network interface into the receive buffer;

a write pointer and a write counter to control the writing of the data message into the receive buffer from the switch network interface;

a control means for reading the data message from the receive buffer into the bus interface; and a read pointer and a read counter to control the reading of the data message from the receive buffer into the bus interface.

14. An adapter card comprising:

insertion means for inserting the adapter card into a card slot of a PC, the card slot including means for coupling an inserted adapter card to a PC bus;

transmission means for transmitting and for converting an unpacketized data message sent between a multi-stage switch network operating under a switch protocol and a PC operating under a PC bus protocol that is different from the switch protocol, said PC including:

a processor coupled to the PC bus, the PC bus including a plurality of bus lines; and means for receiving and sending said data message over the PC bus;

said adapter comprising a retry means where the adapter automatically without processor intervention continues to resend a message until a positive indication is received back over the network that the message has been received without error;

said transmission means comprising:

a receive buffer for storing a complete data message sent from the multi-stage switch network;

a send buffer for storing complete data message sent from the PC;

a clockless switch interface for coupling the adapter to the multi-stage switch network; and a PC bus interface for coupling the adapter to the PC bus.

15. The adapter card of claim 14, wherein the PC bus interface further comprises:

means for identifying control data received over a second subset of the bus lines;

means for identifying data message data received over a third subset of the bus lines;

means for processing the control data; and means for sending the data message data to the send buffer.

16. The adapter card of claim 15, wherein the PC bus interface further comprises:

means for sending to the bus a signal indicating that the receive buffer has stored the data message from the switch network;

means for identifying a read transfer command sent over the PC bus by the processor; and means for sending over the PC bus the data message stored in the receive buffer in response to the read transfer command.

17. The adapter card of claim 16, wherein the switch interface comprises:

means for receiving the complete data message sent from the PC and stored in the send buffer;

means for assembling the data message stored in the send buffer into the switch protocol, the switch protocol including a plurality of bits sent in parallel; and means for sending the data message in the switch protocol to the switch network.

18. The adapter card of claim 14 wherein said bus interface comprises:

means for receiving switch network configuration data to indicate destination IDs of other adapters coupled to the switch network and a size of the switch network to permit delivery of the data message to a designated destination from the switch network;

means for storing the switch network configuration data; and means for converting a data message from the node from said bus protocol to said switch protocol including means for changing a bandwidth of the data message sent from the node, for removing parity bits from the data message sent from the node, and for adding to the data message sent from the node: switch network routing headers having dead fields, a receiver synchronization field, and cycle redundancy checks.

19. The adapter card of claim 14 wherein the send buffer further comprises:

a control means for writing a data message from the bus interface into the send buffer;

a write pointer and a write counter to control the writing of the data message into the send buffer from the bus interface;

a control means for reading the data message from the send buffer into the switch network interface; and a read pointer and a read counter to control the reading of the data message from the send buffer into the switch network interface.

20. The adapter card of claim 14 wherein the receive buffer further comprises:

a control means for writing a data message from the switch network interface into the receive buffer;

a write pointer and a write counter to control the writing of the data message into the receive buffer from the switch network interface;

a control means for reading the data message from the receive buffer into the bus interface; and a read pointer and a read counter to control the reading of the data message from the receive buffer into the bus interface.

* * * * *